(12) United States Patent
Fukui et al.

(10) Patent No.: US 12,001,741 B2
(45) Date of Patent: Jun. 4, 2024

(54) LABEL IMAGE GENERATION DEVICE GENERATING A PLURALITY OF LABEL IMAGES CORRESPONDING TO RESPECTIVE ONES OF A PLURALITY OF LABELS FOR CREATING COMPOSITE LABELS

(71) Applicant: BROTHER KOGYO KABUSHIKI KAISHA, Nagoya (JP)

(72) Inventors: Tomoyasu Fukui, Inuyama (JP);
Ryuichi Kanda, Nagoya (JP);
Hiromichi Nampo, Kiyosu (JP);
Koichi Kondo, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 67 days.

(21) Appl. No.: 17/836,622

(22) Filed: Jun. 9, 2022

(65) Prior Publication Data

US 2022/0398053 A1 Dec. 15, 2022

(30) Foreign Application Priority Data

Jun. 11, 2021 (JP) .................................. 2021-098283

(51) Int. Cl.
*G06F 3/12* (2006.01)
(52) U.S. Cl.
CPC .......... *G06F 3/1243* (2013.01); *G06F 3/1204* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 2014/0347412 A1 | 11/2014 | Jintsugawa et al. | |
| 2015/0082673 A1* | 3/2015 | Durant | G09F 19/14 |
| | | | 40/446 |
| 2017/0185877 A1* | 6/2017 | Yamada | G06F 3/121 |

FOREIGN PATENT DOCUMENTS

| | | |
|---|---|---|
| JP | 2010-017937 A | 1/2010 |
| JP | 2014-226869 A | 12/2014 |

* cited by examiner

*Primary Examiner* — Frantz Bataille
(74) *Attorney, Agent, or Firm* — KENEALY VAIDYA LLP

(57) ABSTRACT

A label image generation device generates label images corresponding to labels for creating composite labels. In each composite label, a label created from a first printing medium and a label created from a second printing medium are overlaid. A control device generates first and second label images to be formed on the first printing medium, and a third label image to be formed on the second printing medium. The control device displays a first composite image and a second composite image. In the first composite image, the first and third label images are overlaid. In the second composite image, the second and third label images are overlaid. The control device controls a printing mechanism to perform printing for creating the first number of first labels, the second number of second labels, and the third number of third labels. The third number depends on both the first and second numbers.

15 Claims, 17 Drawing Sheets

FIG. 7

COMPOSITE LABEL TEMPLATE DATA

| | UPPER LAYER | MIDDLE LAYER | LOWER LAYER |
|---|---|---|---|
| INITIAL EDITING MODE | EDITING ENABLED MODE | SEMI-FIXED EDITING MODE | EDITING DISABLED MODE |
| LABEL IMAGE (OBJECT) | (TEXT) | | |
| COMMON INFO | TAPE WIDTH: 12mm, TAPE LENGTH; 100mm | | |

⇩ READ FROM DB

COMPOSITE LABEL SET DATA

| | UPPER LAYER | MIDDLE LAYER | LOWER LAYER |
|---|---|---|---|
| FIRST GROUP OF LABEL IMAGES | ICHIRO SATO | | |
| SECOND GROUP OF LABEL IMAGES | JIRO SUZUKI | | |
| THIRD GROUP OF LABEL IMAGES | SABURO TAKAHASHI | | |
| FOURTH GROUP OF LABEL IMAGES | SIRO TANAKA | | |
| COMMON INFO | TAPE WIDTH: 12mm, TAPE LENGTH; 100mm | | |

⇧ READ FROM DB

TEXT DATASET

| TEXT | "ICHIRO SATO", "JIRO SUZUKI", "SABURO TAKAHASHI", "SIRO TANAKA" |
|---|---|

FIG. 11
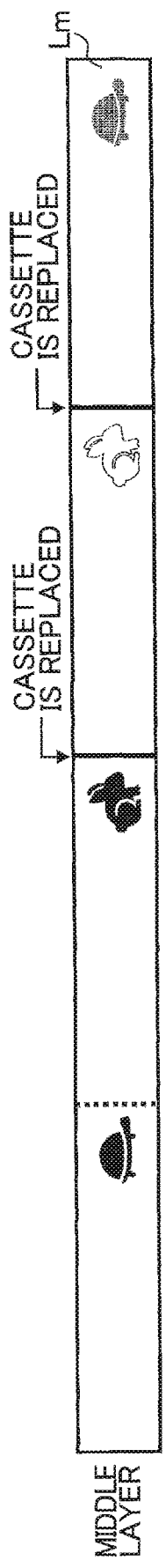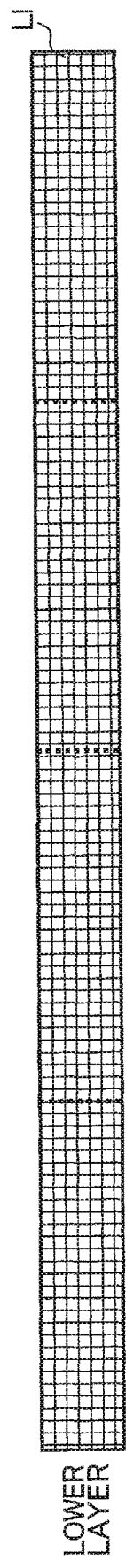

FIG. 16

| COMPOSITE LABEL TEMPLATE DATA | | | |
|---|---|---|---|
| | UPPER LAYER | MIDDLE LAYER | LOWER LAYER |
| INITIAL EDITING MODE | EDITING ENABLED MODE | SEMI-FIXED EDITING MODE / EDITING DISABLED MODE | EDITING DISABLED MODE |
| LABEL IMAGE (OBJECT) | (TEXT) | | |
| COMMON INFO | TAPE WIDTH: 12mm, TAPE LENGTH: 100mm | | |

LABEL IMAGE GENERATION DEVICE GENERATING A PLURALITY OF LABEL IMAGES CORRESPONDING TO RESPECTIVE ONES OF A PLURALITY OF LABELS FOR CREATING COMPOSITE LABELS

CROSS REFERENCE TO RELATED APPLICATION

This application claims priority from Japanese Patent Application No. 2021-098283 filed Jun. 11, 2021. The entire content of the priority application is incorporated herein by reference.

BACKGROUND

Conventional technologies for editing print images to be printed on different types of tapes (print media) are known in the art. The plurality of tapes is then laminated together to create a label.

SUMMARY

One of these conventional technologies describes an image displaying device that displays a composite image resulting from superimposing a plurality of media print images to be printed on individual print media, separately from a screen displaying the plurality of media print images.

However, the user may wish to create a plurality of composite labels formed by overlaying a plurality of labels having both fixed areas configured of objects and a background common to each label, and variable areas configured of objects unique to each label, for example. Using the conventional technology described above in such cases, the user must edit a media print image for each label constituting each composite label. This technique is inconvenient as it increases the user's operational load.

In view of the foregoing, it is an object of the present disclosure to provide a technology that simplifies the creation of labels and has less operational burden than conventional technologies for creating composite labels formed by overlaying a plurality of print media.

In order to attain the above and other objects, one aspect of the disclosure provides a non-transitory computer readable storage medium storing a set of program instructions installed on and executed by a computer included in a label image generation device for generating a plurality of label images corresponding to respective ones of a plurality of labels. The plurality of label images is used for creating one or more composite labels. In each of the one or more composite labels a label created from a first printing medium and a label created from a second printing medium are overlaid. The set of program instructions includes: a first generation process to generate a first label image to be formed on the first printing medium; a second generation process to generate a second label image to be formed on the first printing medium; a third generation process to generate a third label image to be formed on the second printing medium; displaying a first composite image and a second composite image, wherein in the first composite image, the first label image and the third label image are overlaid, wherein in the second composite image, the second label image and the third label image are overlaid; and outputting a print instruction to a printing mechanism to print the first label image on the first printing medium for creating the first number of first labels, to print the second label image on the first printing medium for creating the second number of second labels, and to print the third label image on the second printing medium for creating the third number of third labels, the third number being the sum of the first number and the second number.

According to another aspect, the disclosure provides a non-transitory computer readable storage medium storing a set of program instructions installed on and executed by a computer included in a label image generation device for generating a plurality of label images corresponding to respective ones of a plurality of labels, the plurality of label images being used for creating one or more composite labels. In each of the one or more composite labels a label created from a first printing medium and a label created from a second printing medium are overlaid. The set of program instructions includes: acquiring a piece of base data from among one or more pieces of base data, the acquired piece of base data including a first object region and a second object region, each piece of base data being data to be used for generating a plurality of label images; displaying a first editing screen corresponding to the first object region and a second editing screen corresponding to the second object region, each of the first editing screen and the second editing screen being for modifying the acquired piece of base data, editing in the first editing screen being made within a first allowable degree of freedom, editing in the second editing screen being made within a second allowable degree of freedom; and generating the plurality of label images based on at least one of modification of the acquired piece of base data through the first editing screen and modification of the acquired piece of base data through the second editing screen.

According to another aspect, the disclosure provides a label image generation device. The label image generation device includes a control device to generate a plurality of label images corresponding to respective ones of a plurality of labels. The plurality of label images is used for creating one or more composite labels. In each of the one or more composite labels a label created from a first printing medium and a label created from a second printing medium are overlaid. The control device is configured to perform: a first generation process to generate a first label image to be formed on the first printing medium; a second generation process to generate a second label image to be formed on the first printing medium; a third generation process to generate a third label image to be formed on the second printing medium; displaying a first composite image and a second composite image, wherein in the first composite image, the first label image and the third label image are overlaid, wherein in the second composite image, the second label image and the third label image are overlaid; and controlling a printing mechanism to print the first label image the first number of times on the first printing medium for creating the first number of first labels, to print the second label image the second number of times on the first printing medium for creating the second number of second labels, and to print the third label image the third number of times on the second printing medium for creating the third number of third labels, the third number depending on both the first number and the second number.

According to another aspect, the disclosure provides a label image generation device. The label image generation device includes a control device to generate a plurality of label images corresponding to respective ones of a plurality of labels. The plurality of label images is used for creating one or more composite labels. In each of the one or more composite labels a label created from a first printing medium and a label created from a second printing medium are overlaid. The control device is configured to perform: acquiring a piece of base data from among one or more pieces of base data, the acquired piece of base data including a first object region and a second object region, each piece of base data being data to be used for generating a plurality of label images; displaying a first editing screen corresponding to the first object region and a second editing screen corresponding to the second object region, each of the first editing screen and the second editing screen being for modifying acquired piece of base data, editing in the first editing screen being made within a first allowable degree of freedom, editing in the second editing screen being made within a second allowable degree of freedom; and generating the plurality of label images based on at least one of modification of the acquired piece of base data through the first editing screen and modification of the acquired piece of base data through the second editing screen.

BRIEF DESCRIPTION OF THE DRAWINGS

The particular features and advantages of the disclosure as well as other objects will become apparent from the following description taken in connection with the accompanying drawings, in which:

FIG. 7 is an explanatory diagram illustrating an initial process for creating composite label set data;

FIG. 11 is an explanatory diagram illustrating changing a printing order of print labels so that print label images having a same color are printed continuously when continuous printing is performed on a layer-by-layer basis;

FIG. 16 is a table illustrating composite label template data used when a plurality of editing modes is set in a print label image.

DETAILED DESCRIPTION

Figure 1:
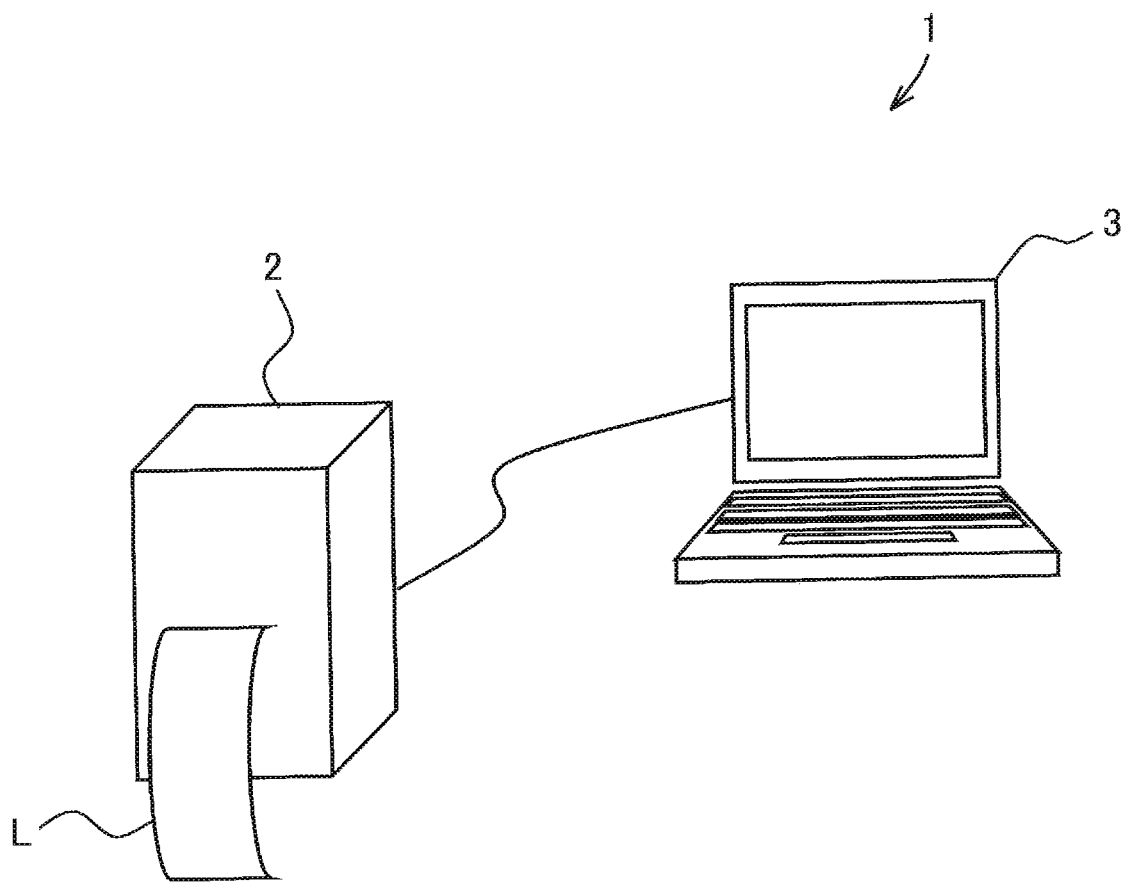
FIG. 1 is an explanatory diagram illustrating overall configurations of a operation terminal and a label printer according to an embodiment.

A first embodiment of the present disclosure will be described while referring to the drawings.

Overall Configuration of a Printing System

FIG. 1 shows the overall configuration of a printing system 1 according to the present embodiment. In FIG. 1, the printing system 1 has a label printer 2, and an operation terminal 3, for example. The operation terminal 3 is configured of a common personal computer. The operation terminal 3 is connected to and capable of exchanging information with the label printer 2. In the example depicted in FIG. 1, the operation terminal 3 is connected to the label printer 2 via a wired connection. However, while not illustrated in the drawing, the operation terminal 3 may be connected to the label printer 2 via a wireless connection. In addition to the common personal computer described above, the operation terminal 3 could be configured of a portable terminal such as a smartphone or a tablet computer. The wired connection may be achieved with a wired LAN technology, such as Ethernet (registered trademark), or a USB connection. The wireless connection may be achieved according to a wireless LAN, such as Wi-Fi (registered trademark), or Bluetooth (registered trademark). The label printer 2 creates print labels L based on user operations on the operation terminal 3. Here, the operation terminal 3 is an example of the image generating device, and the label printer 2 is an example of the printing mechanism.

Operation Terminal

Figure 2:
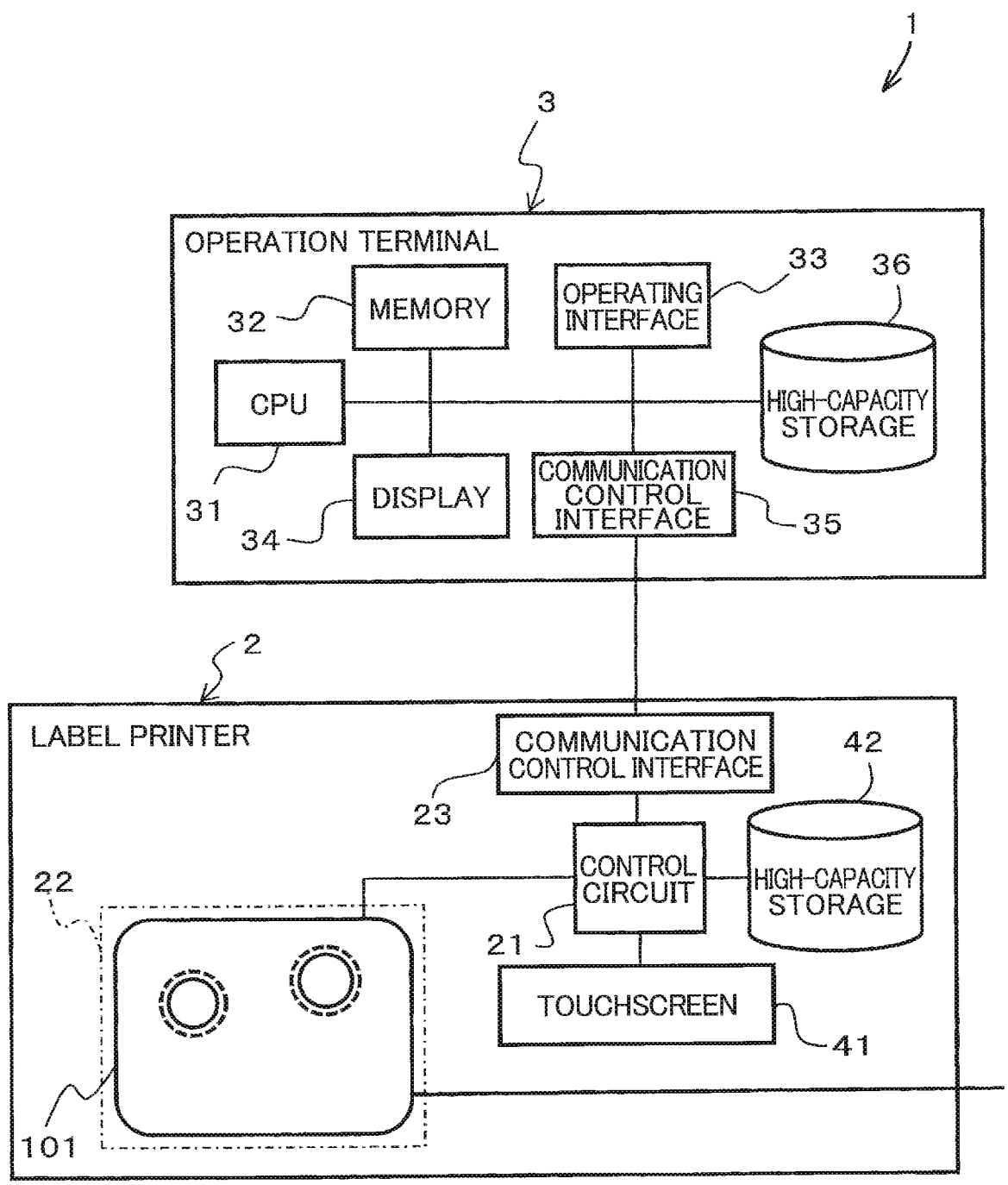
FIG. 2 is a block diagram illustrating functional configurations of the operation terminal and the label printer.

As shown in FIG. 2, the operation terminal 3 is provided with a CPU 31, a memory 32, an operating interface 33, a display 34, a communication control interface (network interface) 35, and a high-capacity storage 36. The memory 32 is configured of RAM and ROM, for example.

The operating interface 33 is configured of a mouse and keyboard, for example. The user inputs instructions, information, and the like into the operation terminal 3 via the operating interface 33. The display 34 is configured of a liquid crystal display, for example. The display 34 displays various information and messages. The communication control interface 35 controls the exchange of signals with the label printer 2 through wired communication in this example. The high-capacity storage 36 stores various programs and information. The CPU 31 uses the temporary storage function of the RAM in the memory 32 to perform various processes and to exchange various signals with the label printer 2 according to programs pre-stored in the ROM of the memory 32 or the high-capacity storage 36. In this example, a label image creating program, a plurality of pieces of composite label template data, a plurality of text datasets, and a plurality of pieces of object data are stored in the memory 32 or high-capacity storage 36 in advance.

Label Printer

As shown in FIG. 2, the label printer 2 has a control circuit 21, a cartridge holder 22, a communication control interface 23, a touchscreen 41, and a high-capacity storage 42. A cartridge 101 is detachably mountable in the cartridge holder 22. The label printer 2 can exchange information with the operation terminal 3 when the control circuit 21 connects to the communication control interface 35 of the operation terminal 3 via the communication control interface 23. The touchscreen 41 is configured by combining a liquid crystal display with a touchpad. The touchscreen 41 displays various information and messages and accepts user input of commands and the like at operated positions on the display screen. In this example, a plurality of pieces of object data, and the like described later are stored in the high-capacity storage 42 in advance.

In the embodiment, the CPU 31 is an example of the control device, the controller, or the processor, a display 34 is an example of the display, the memory 32 and the high-capacity storage are examples of the storage.

Cartridge and Cartridge Holder

Figure 3:
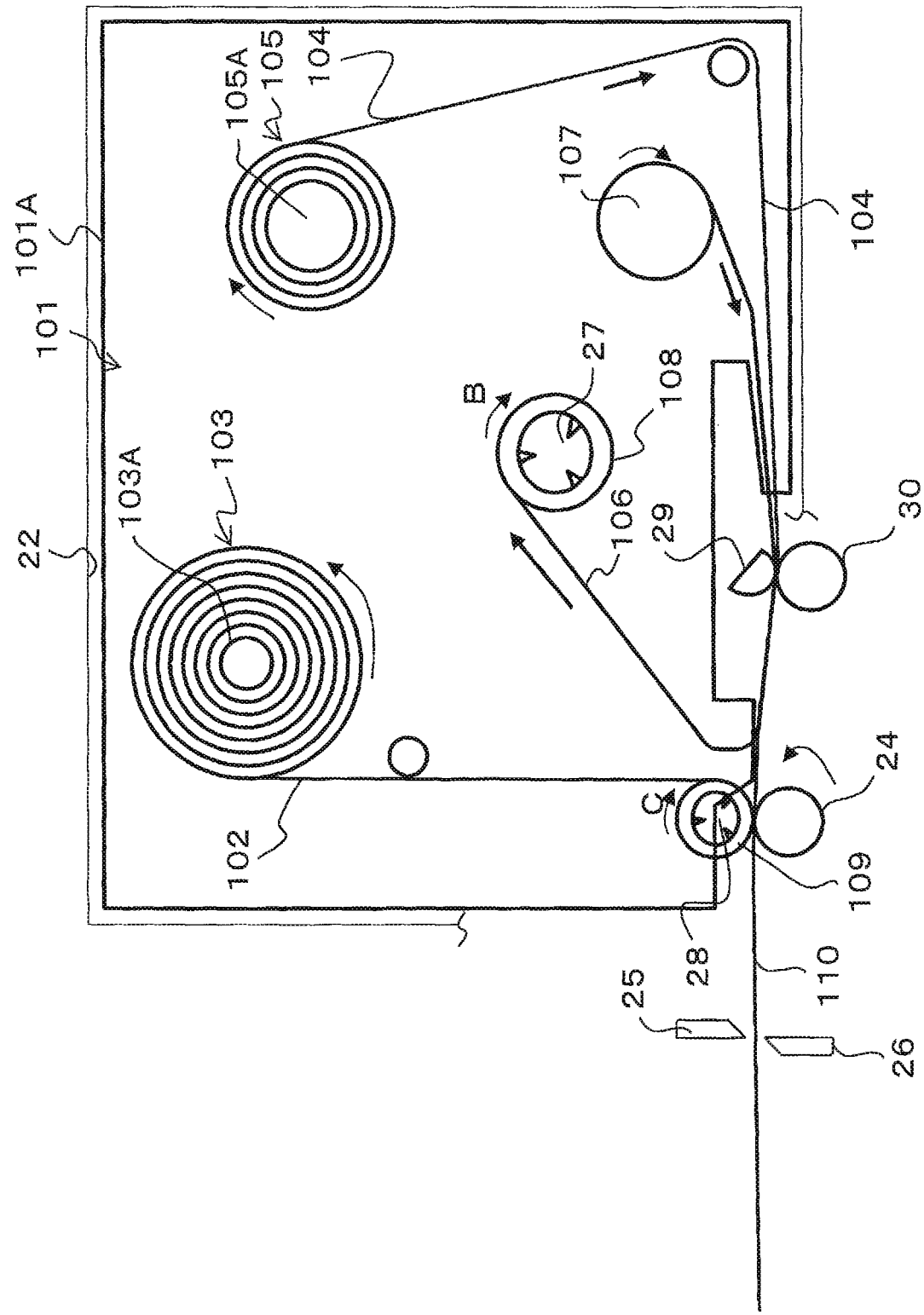
FIG. 3 is a schematic diagram illustrating internal structures of a cartridge.

FIG. 3 shows a detailed structure of the cartridge 101 and the related structure of the cartridge holder 22. The cartridge 101 has a housing 101A and, disposed within this housing 101A, a first roll 103, a second roll 105, a ribbon supply roll 107, a ribbon take-up roller 108, and a tape feed roller 109. The first roll 103 is formed of a strip-like base tape 102 wound into a roll. The second roll 105 is formed of a transparent cover film 104 having the same width as the base tape 102. The second roll 105 is also wound into a roll. The ribbon supply roll 107 pays out an ink ribbon 106. The ribbon take-up roller 108 takes up the ink ribbon 106 that has been used for printing. The tape feed roller 109 is rotatably supported near a tape discharge portion of the cartridge 101. Note that the ink ribbon 106 is unnecessary when the cover film 104 is a thermal tape that can produce a prescribed color when heated. Further, although depicted as concentric circles in the drawing for simplification, the first roll 103 and second roll 105 are actually wound in a spiral shape.

More specifically, the first roll 103 includes a reel member 103A around which the base tape 102 is wound. The base tape 102 is configured of a bonding adhesive layer, a base layer, a mounting adhesive layer, and a release layer, for example. These layers are laminated sequentially from the inward-facing side of the base tape 102 forming the first roll 103 toward the opposite side. The second roll 105 similarly includes a reel member 105A around which the cover film 104 is wound. The tape feed roller 109 bonds the base tape 102 to the cover film 104 with pressure to form a print label tape 110 while conveying the same.

A ribbon take-up roller drive shaft 27 and a tape feed roller drive shaft 28 are disposed in the cartridge holder 22. The ribbon take-up roller drive shaft 27 is provided for taking up the portion of the ink ribbon 106 already used for printing in the cartridge 101. The tape feed roller drive shaft 28 is provided for conveying the print label tape 110 described above. A conveying roller motor (not shown) transmits a drive force to the ribbon take-up roller drive shaft 27 and the tape feed roller drive shaft 28 for driving the ribbon take-up roller 108 and the tape feed roller 109 to rotate in association with the ribbon take-up roller drive shaft 27 and the tape feed roller drive shaft 28. The cartridge holder 22 is also provided with a print head 29 that prints desired content on the cover film 104 as the cover film 104 is conveyed.

A fixed blade 25 and a movable blade 26 are provided along the conveying path of the print label tape 110 on the downstream side of the tape feed roller 109 and a pressure roller 24 described later. In cooperation with the fixed blade 25, the movable blade 26 cuts through the print label tape 110 in the thickness direction.

Outline of Label Printer Operations

In the label printer 2 having the above construction, the cover film 104 and the ink ribbon 106 become interposed between the print head 29 and a platen roller 30 opposing the print head 29 when the cartridge 101 is mounted in the cartridge holder 22. At the same time, the base tape 102 and the cover film 104 become interposed between the tape feed roller 109 and a pressure roller 24 opposing the tape feed roller 109. When the ribbon take-up roller 108 and the tape feed roller 109 are driven to rotate in synchronization in the directions indicated in FIG. 3 by the respective arrows B and C, the pressure roller 24 and the platen roller 30 rotate. The base tape 102 is paid out from the first roll 103 and supplied to the tape feed roller 109. The cover film 104 is paid out from the second roll 105 while a print driving circuit (not shown) energizes a plurality of heating elements in the print head 29 to print on the cover film 104. The ribbon take-up roller drive shaft 27 drives the ribbon take-up roller 108 to take up ink ribbon 106 that was used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 conveyed out of the cartridge 101 is cut off through the cooperative operations of the fixed blade 25 and the movable blade 26, producing a print label L.

Editing and Creating Plurality of Composite Labels

Each print label L created on the label printer 2 having the above construction has a background color and an object color determined by the colors of the base tape 102 and the ink ribbon 106 in the housing 101A of the cartridge 101 being used. Thus, a single print label L can express a maximum of two colors, with the tape color of the base tape 102 rendering the background color and the color of the ink ribbon 106 rendering the printing color of the object. However, when a second print label L having a transparent (clear) tape color and an object printed in a different printing color is overlaid on and bonded to the top surface of the first print label L, it is possible to create a print label L expressing three colors since the background color and printing color in the bottom layer can be seen through the second transparent print label L. The print label tapes 110 whose color combinations of the base tape 102 and the ink ribbon 106 are different from each other are examples of first-fifth printing media.

In the present embodiment, a label created by superposing and bonding together a plurality of print labels L in the thickness direction in this way will be called a composite label LS. In the embodiment, a plurality of print labels L that composes one composite label LS will also be referred to as a group of print labels. In other words, one group indicates one composite label LS in the present disclosure. The composite label LS is a set of laminated labels that can express three or more colors. The user overlays a plurality of print labels L that were printed on the label printer 2 based on their individual label data and bonds the labels together. Subsequently, the user can affix the labels in this bonded state to a desired object.

One manner of creating a plurality of composite labels LS, each of which has a plurality of print labels L laminated in a group as described above, is to use a composite label set including a plurality of composite labels (a plurality of groups of print labels) that possesses somewhat uniform design characteristics. A specific example of such a composite label set having the plurality of composite labels is shown in the right side of FIG. 4. In this example, only print content such as a text object in a specific layer of the print labels L differs among the groups (the composite labels LS), while other print content, such as graphic objects, and the tape colors in all other layers of print labels L are the same. This composite label set makes it possible to create a set of nameplates having uniform design characteristics overall but a unique name for the owner of each nameplate.

Figure 4:
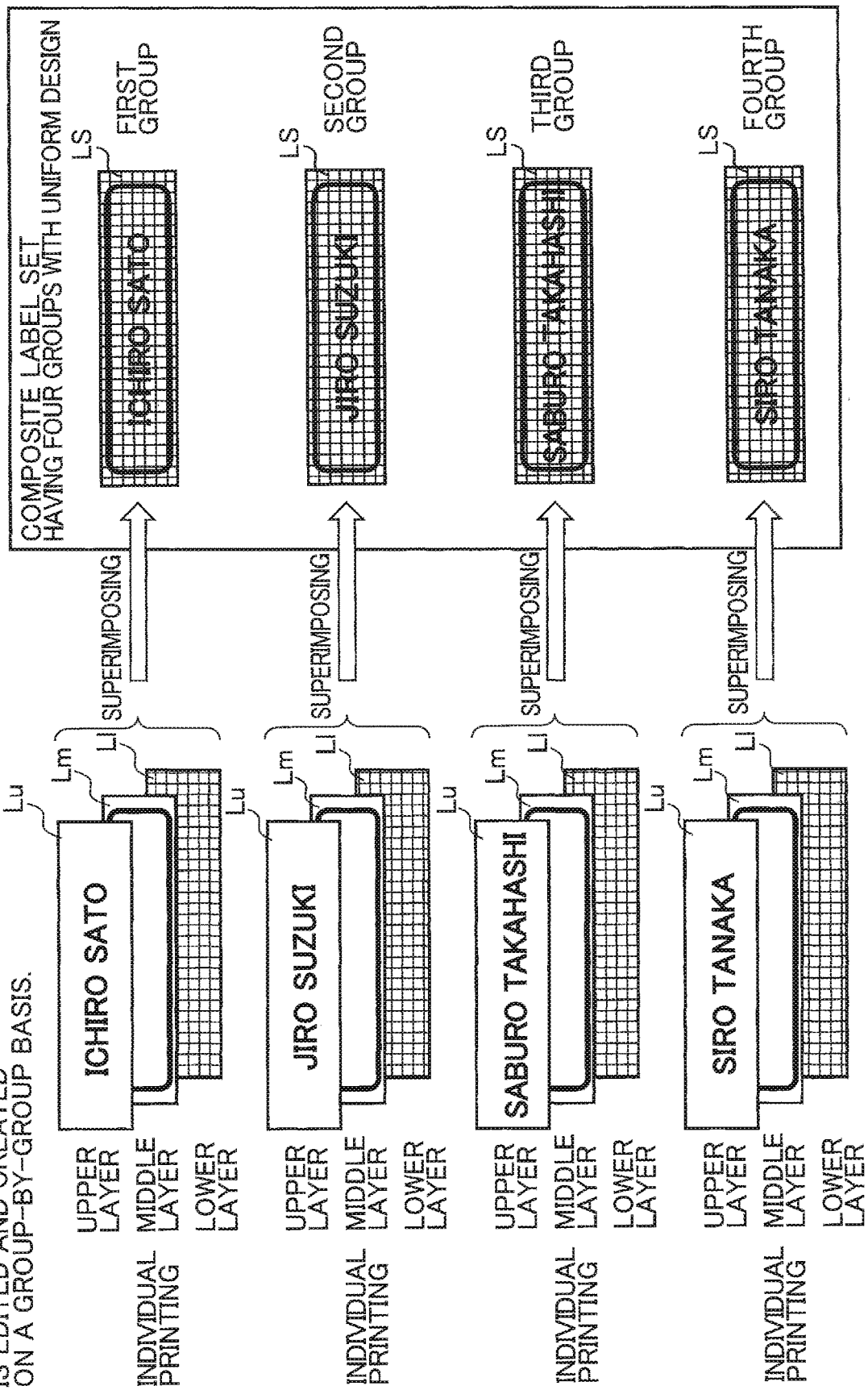
FIG. 4 is an explanatory diagram illustrating a comparative example in which a composite label set is edited and created on a group-by-group basis.

Each nameplate in the examples of FIG. 4 has three layers having the same tape length and tape width: an upper-layer print label Lu, a middle-layer print label Lm, and a lower-layer print label Ll. For each group of labels, the upper-layer print label Lu has a text object indicating the individual owner's name printed on a cover film 104 bonded to a transparent base tape 102. The middle-layer print label Lm has a graphic object depicting a rectangular frame with rounded corners printed on a cover film 105 bonded to a transparent base tape 102. The rectangular frame has a size and arrangement for surrounding the entire text object of the owner's name. The lower-layer print label Ll has a specific background mesh pattern printed on a cover film 104, which is bonded to a base tape 102 of a specific tape color constituting the background color.

The conventional label image creating program used for editing print data of a composite label LS on the operation terminal 3 can only edit print label images for one composite label LS in a single editing process. Thus, in the case of the nameplates described above, the conventional program can only be used to edit one group of print label images at once. For a nameplate set having a plurality of groups (composite labels), in the conventional program, each composite label LS has to be edited and created individually by saving and repeatedly copying print data for each group.

To create one group (one composite label LS) in this case, cartridges 101 must be interchanged to create the print label L for each layer every time the printing color or tape color differs among the layers. This replacement operation must be repeatedly performed for each group (each composite label LS) when further creating a plurality of composite labels LS, resulting in a very tedious process.

Figure 5:
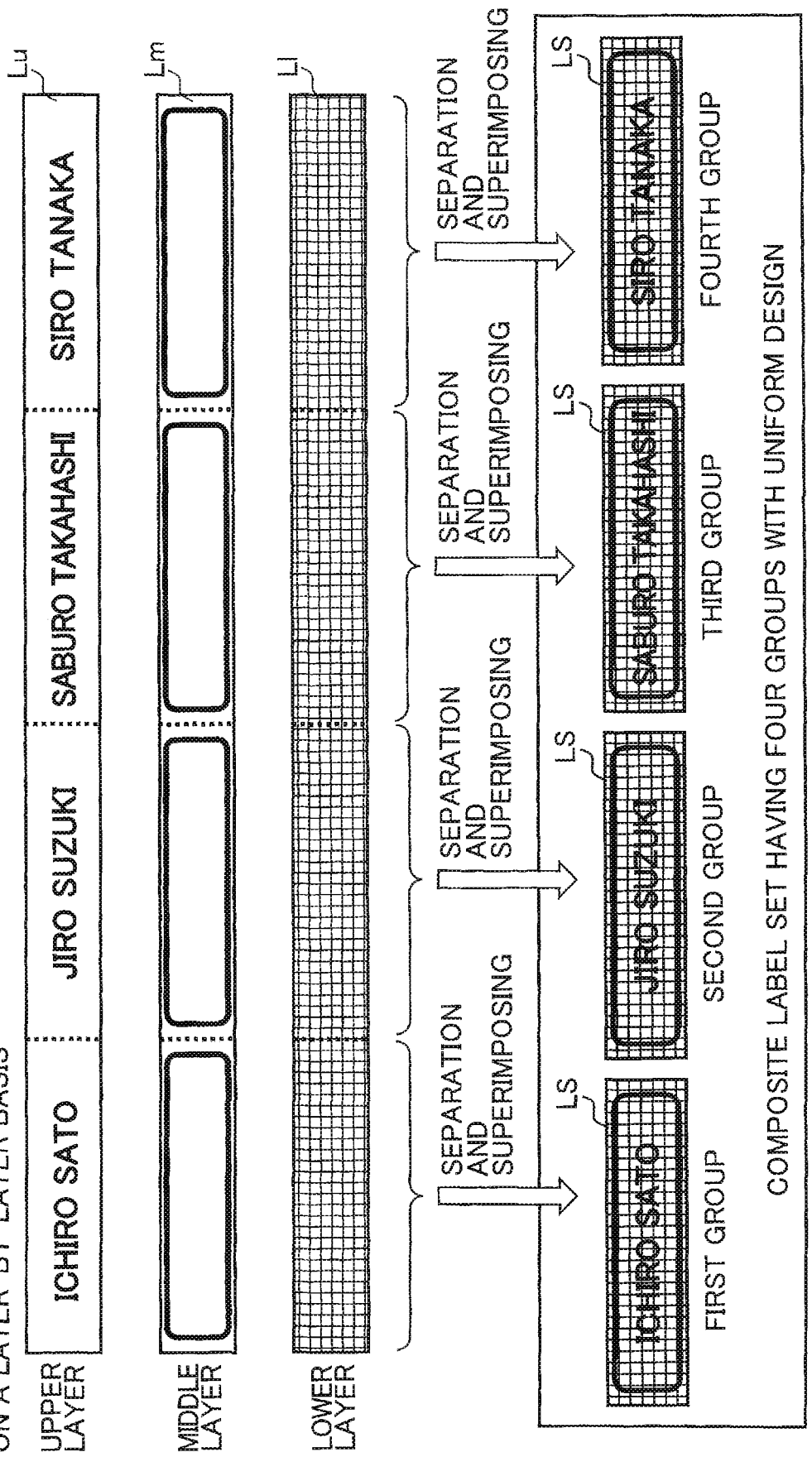
FIG. 5 is an explanatory diagram for illustrating a case in which a plurality of print labels in a composite label set is edited and created all together.

However, with the label image creating program in the example of the present embodiment, the print label images of the plurality of groups (the plurality of composite labels LS) are edited altogether in a single editing process, and the plurality of pieces of label image data created as a result is outputted all at once to the label printer 2 for printing. Thus, in a case that each group (each composite label LS) has the same number of layers, label image data for print labels L constituting the same layer can be printed continuously all at once, as illustrated in FIG. 5. Further, in a case that the printing color, the tape color, and the tape width are all common for a same layer in all the groups (all the composite labels LS), for example, labels L in the layer can be printed continuously without having to replace the cartridge 101 when continuous printing on a layer-by-layer is performed. In this case, printing in each layer creates a single printed matter which is connected by one sheet of release paper and includes a plurality of print labels L of the layer separated each other by half cuts therebetween. Here, the half cut is made by a half cut operation in which the blades 25 and 26 cut the cover file 104 in the print label tape 110 but does not cut at least the release layer of the base tape 102 in the print label tape 110.

The user can suitably create a plurality of composite labels LS from printed matters of all the layers. Specifically, the user can create each composite label LS (each group) by separating print labels L from the respective printed matters for all the layers on a same group and bonding these separated print labels L of the group all together. The user repeats this creation of the composite label on the group-by-group basis according to the printing order of groups (described later) Note that in the case of the nameplates depicted in this example, both the upper-layer print label Lu and the middle-layer print label Lm have transparent base tapes 102 and, hence, the order for bonding these two layers together may be reversed.

Editing Screen and Data Process for a Composite Label Set

Figure 6:
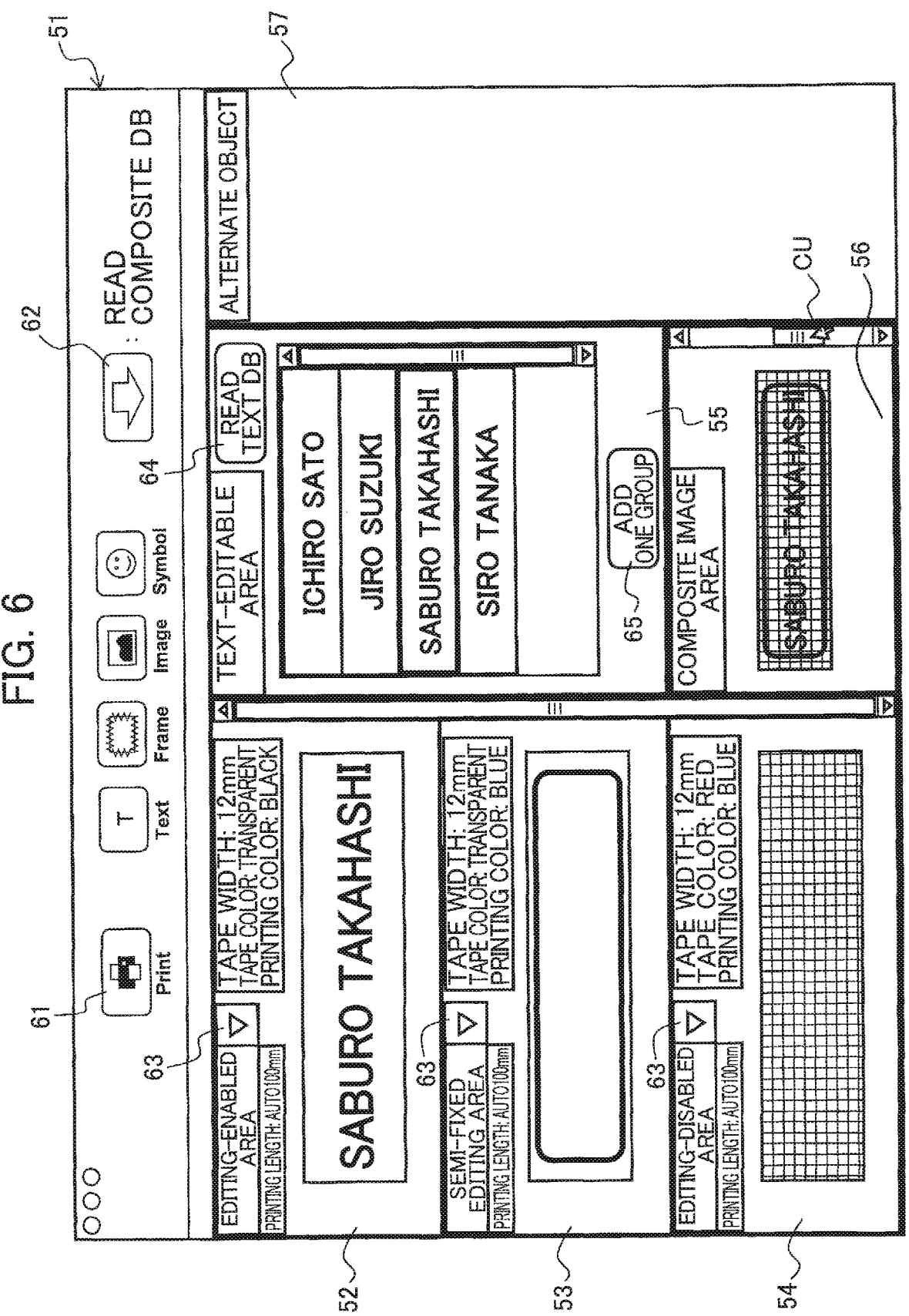
FIG. 6 is an explanatory diagram illustrating an example of an editing screen on the operation terminal to edit composite label data.

Next, a sample display of an editing screen for editing a composite label set according to the embodiment described above will be described with reference to FIG. 6. Here, the composite label set includes a plurality of composite labels (a plurality of groups of print labels). FIG. 6 shows an editing screen displayed on the display 34 as a GUI-type operation screen for editing a composite label set corresponding to the nameplates described above. In the display example shown in FIG. 6, the text object on the upper-layer print label Lu the image object on the middle-layer print label Lm can be edited in any of the groups (any of the composite labels LS), while a lower-layer print label Ll are fixed in a non-editable state.

This editing screen has an overall frame 51. In the upper portion of the overall frame 51, various operation buttons are displayed. Displayed altogether in the remainder of the overall frame 51 are three editing area frames 52, 53, and 54 each corresponding to an individual layer of the composite label; a text-editable area frame 55; a composite image area frame 56; and an alternate object frame 57.

The operation buttons in the upper portion of the overall frame 51 include a print output button 61, and a read composite label template data button 62 described later (denoted as "Read Composite DB" in the drawing).

In the example shown in FIG. 6, the editing area frames 52, 53, and 54 are arranged vertically in the left section of the overall frame 51 and display print label images corresponding to the upper layer, the middle layer, and the lower layer, respectively, in descending order from the top. Information on the editing mode is displayed in the upper-left corner of each of the editing area frames 52, 53, and 54. The editing mode indicates an allowable range of editing (an allowable degree of freedom for editing). The editing modes to be set include an editing enabled mode, a semi-fixed editing mode, an editing disabled mode. That is, the editing mode define an allowable range (allowable degree of freedom) within which an object corresponding to the editing mode can be edited or changed. The editing enabled mode is an editing mode that allows the user to edit objects in the print label image but does not permit the user to change the color of objects in the print label being edited. The semi-fixed editing mode is an editing mode that allows the user to edit objects or the color of objects in the print label image within a limited range only (within a limited degree of freedom). The editing disabled mode is an editing mode that does not allow the user to edit any objects or parameters in the print label image. The displayed information on the editing mode indicates whether the corresponding editing area frames 52, 53, and 54 are currently an "editing-enabled area" corresponding to the editing enabled mode, a "semi-fixed editing area" corresponding to the semi-fixed editing mode, or an "editing-disabled area" corresponding to the editing disabled mode. In the following description, the editing area frames corresponding to each of these editing modes will be respectively called an editing-enabled area frame, a semi-fixed editing area frame, and an editing-disabled area frame.

The initial editing mode for each of the editing area frames 52, 53, and 54 of the corresponding layers is set in composite label template data (described later with reference to FIG. 7). However, a menu button 63 is located on the right of each editing mode display, and the user can switch to a desired editing mode by operating the menu button 63 with a cursor CU to display a pull-down menu (not shown). Within each of the editing area frames 52, 53, and 54 are displayed the printing length of the print label L and cartridge data (tape width, tape color, and printing color) for each corresponding layer, as well as a print label image that reflects this data. Further, the editing area frame that is currently designated by the user as the editing target is displayed with a bold line depicting its outer frame (see the middle-layer editing area frames in FIGS. 8 and 10 described later). Note that although each group (each composite label) has three layers in the composite label set data of this illustrated example, the composite labels may be configured of three or more layers, editing area frames may be prepared for these layers, and the display of the editing area frames may be scrolled as needed (not shown in the drawings).

In the illustrated example, the text-editable area frame 55 is arranged in the upper-center region of the overall frame 51. A plurality of text objects in the plurality of groups is listed in the text-editable area frame 55 for text objects to be displayed in the editing area frame 52. That is, the text-editable area frame 55 displays a list of text objects included in the print label images in all the groups (in all the composite labels LS), and particularly in the layers for which editing can be made. The text object currently selected as the editing target is circumscribed by a bold border in the display, and the user can perform editing operations on the text object selected as the editing target in the text-editable area frame 55. In the example of FIG. 6, "Saburo Takahashi" is the editing target in the text-editable area frame 55, and the user can edit this text object through operations on the operating interface 33 to change the surname to "Takada" from "Takahashi", for example. Also displayed in the text-editable area frame 55 are a read text dataset button 64 (designated as "Read Text DB" in the drawing), and an Add Text button 65 ("Add One Group" in the drawing).

In the illustrated example, the composite image area frame 56 is arranged in the lower-center region of the overall frame 51. The composite image area frame 56 displays a label image represented by one composite label LS (one group), i.e., a composite image formed by combining the print label images for all the layers of the composite label LS. The user can select any one of composite labels LS to be the display target and can switch the display among composite labels LS through a scrolling operation in the composite image area frame 56. Additionally, the print label image for each layer displayed in the corresponding editing area frames 52, 53, and 54 is switched in real-time in synchronization with a selection operation performed in the composite image area frame 56. In other words, the displays in the editing area frames 52, 53, and 54 are switched at the same time a composite label LS (one group) is selected to be edited.

The alternate object frame 57 displays a list of candidates for graphic objects. Each graphic object in the list can be newly added to or interchanged with one or more graphic objects in any of the composite labels LS during operations to edit the graphic objects (see FIG. 10 described later).

When the label image creating program is started up on the operation terminal 3, the frames for displaying print label images, composite images, and text objects are all displayed blank in the initial screen. When the user operates the read composite label template data button 62 in this initial screen, a plurality of pieces of composite label template data pre-stored in the memory 32 or high-capacity storage 36 are read and displayed as a list in a separate screen (not shown in the drawings) from which the user can make a desired selection. A piece of template data selected by the user is read as the template. As a result, the label image creating program directly generates composite label set data internally based on the selected composite label template data, as illustrated in FIG. 7. The composite label set data generated at this time only includes one piece of composite label data (one piece of data for one group) in which the number of layers, object content, and editing mode for each layer, common information, and the like are the same as those in the data content of the selected composite label template data.

The composite label template data is an example of the base data. Data of each of the upper-layer print label Lu, the middle-layer print label Lm in the composite label template data is example of the first base data, and data the lower-layer print label Ll in the composite label template data is an example of the second base data. The information of the initial editing mode recorded in the composite label template data is an example of the generation allowable degree of freedom and an example of the editing allowable degree of freedom. The information of the initial editing mode for the upper layer and the middle layer is an example of the first information, and the information of the initial editing mode for the lower layer is an example of the second information. The composite image area frame 56 is an example of the composite display area. The editing area frames 52 and 53 corresponding to the upper layer and the middle layer are examples of the first display area. The semi-fixed editing area corresponding to the middle layer is an example of the third display area, and the editing-disabled frame 54 corresponding to the lower layer is an example of the second display area. The text-editable area frame 55 is an example of the editing area for editing the object information which is to be inputted into the label image formed on the first printing medium.

When the user subsequently operates the read text dataset button 64, a plurality of text datasets pre-stored in the memory 32 or the high-capacity storage 36 is read and displayed as a list in a separate screen (not shown in the drawings). Here, each text dataset includes a plurality of pieces of text data representing respective ones of a plurality of text objects (or texts). When the user selects one text dataset from this list, the selected dataset including a plurality of pieces of text data are read. As shown in FIG. 7, composite label data in the composite label set data is copied a number of times equivalent to the number of pieces of text data in the selected text dataset, and the piece of text data is individually incorporated into the text layer of the respective piece of composite label data. That is, pieces of composite label data are generated the number equivalent to the number of pieces of text data in the selected text dataset. The sample display content in the editing screen shown in FIG. 6 is the result of the above process.

The user can also copy and add an additional piece of composite label data for one composite label (one group) to the label set data currently being edited by operating the Add Text button 65. By performing operations in the editing enabled area frame, the user can edit any of various parameters for the layer corresponding to the editing enabled mode, such as the printing pattern and size of the print object itself.

Further, when the tape printing length must be increased or decreased due to editing performed on the text object, for example, the printing length is automatically adjusted to a suitable length based on the edited content. This adjustment is automatically applied uniformly to print labels of other layers in the same composite label (the same group). Note that the tape printing length may be set differently for each composite label (each group) or may be set uniformly for all composite labels (all groups) based on the largest tape printing length among these groups. The tape printing length for an upper layer of a composite label LS (a group) should at least be set so as not to exceed the tape printing length for lower layers of the same composite label LS (the same group).

Figure 8:
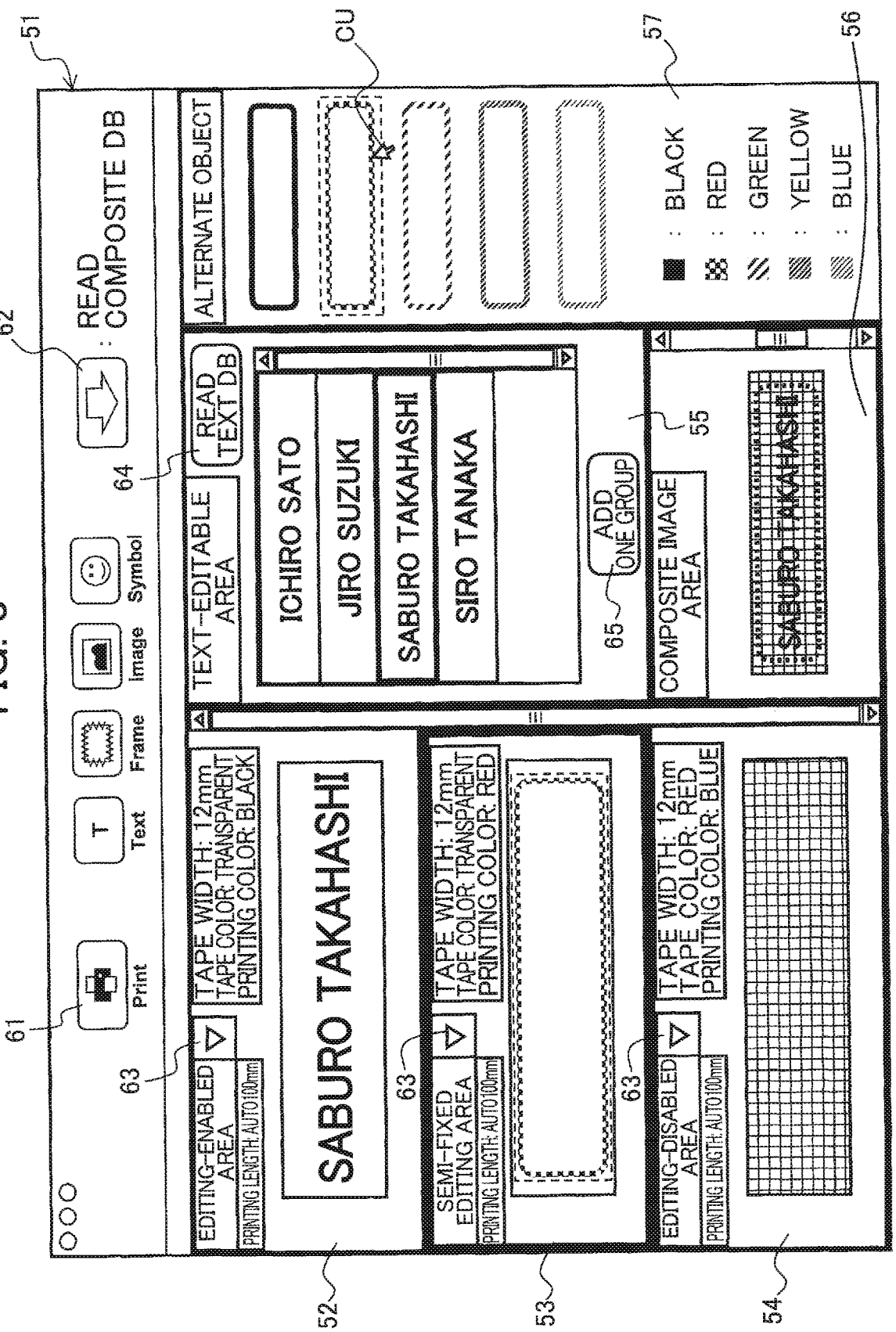
FIG. 8 is an explanatory diagram illustrating an example of the editing screen in a semi-fixed editing mode to display a list of a plurality of alternate objects having different printing colors.

With regard to the print label image of a layer corresponding to a semi-fixed editing area frame, editing operations can be performed only partially on the print objects or parameters set in this print label image according to the semi-fixed editing mode described above. By setting elements that cannot be modified in the composite label template data, uniformity of design can be ensured across all the composite labels (all the groups). As shown in FIG. 8, in a case that the printing color is the only parameter set to be editable in the semi-fixed editing mode, for example, a plurality of interchangeable alternate objects prepared in advance that differ only in printing color are listed in the alternate object frame 57. Settings for such editable parameters and alternate objects may be included in advance in the content of the composite label template data selected to be the template. When the user selects any of the plurality of alternate objects displayed in this list, the selected alternate object is reflected in real-time in the print label image displayed in corresponding one of the editing area frames 52, 53, 54 (the editing frame 53 in this case) and the composite image displayed in the composite image area frame 56, and data for the composite label set is modified accordingly.

Once editing operations are complete, the user presses the print output button 61 to output label image data for each of the print label images to the label printer 2 in a suitable printing order for printing each of the layers described above in sequence.

Figure 9:
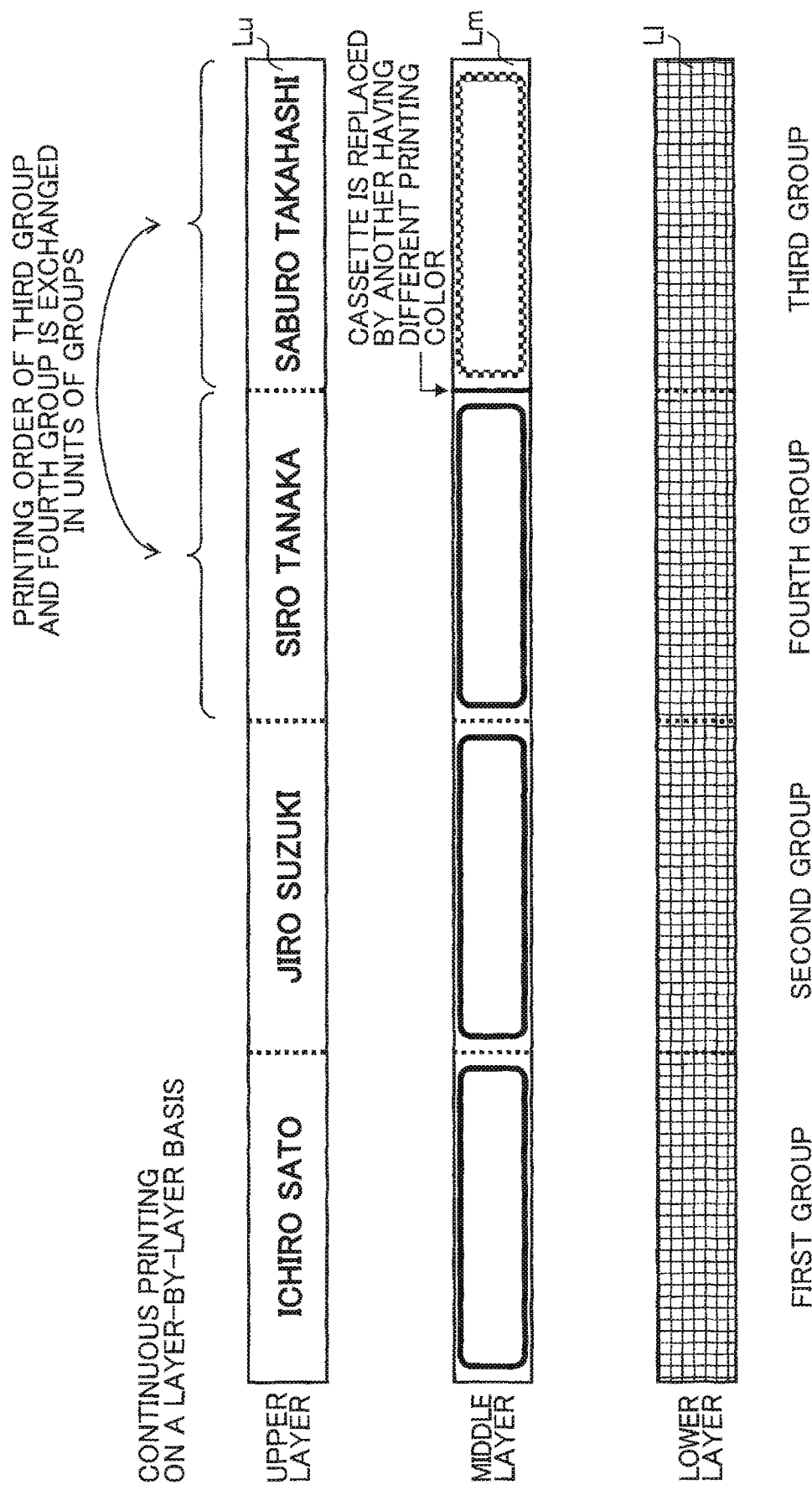
FIG. 9 is an explanatory diagram illustrating changing a printing order of print labels so that print label images having a same color are printed continuously when continuous printing is performed on a layer-by-layer basis.

When print labels L are to be continuously printed on a layer-by-layer basis, modifications made to the printing color or other cartridge data as described above may necessitate a change in the printing orders of print labels for all the layers. For example, it will be assumed that four composite labels LS including first, second, third, and fourth composite labels LS are edited in the editing screen as shown in FIG. 8. Here, the ordinal numeral (first, second, third, and forth) of the composite label LS indicates the initial order of the composite labels LS, that is, the order of groups, in the composite label set (the pieces of composite label data generated) as shown in FIG. 7. The same ordinal numeral for the composite label will be used for the ordinal numeral of print labels in the same composite label LS (the same group). For example, print labels in the first composite label LS (the first group) is referred to as the printing labels in the first group, or first print labels. In a case that only the graphic object in the third group was modified to have a different printing color from the other first, second, and fourth groups, as in the example of FIG. 8, attempting to continuously print the graphic objects of middle layers in the order of first, second, third, and fourth groups would require replacing the cartridge 101 during this printing process with the cartridge 101 having the different printing color only for the print label of the third group. This increases the number of user operations since a replacement operation for replacing cartridges 101 must be performed a total of two times: at the transition timing from the print label of the second group to that of the third group and the transition timing from the print label of the third group to that of the fourth group. These replacement operations make the process more cumbersome. In order to address this problem, in the present embodiment, print data (label image data) is outputted after exchanging the printing order of the third group and the fourth group for each layer, as illustrated in FIG. 9, so that print labels of groups having the same printing color can be printed continuously, effectively reducing the number of replacement operations for the cartridge 101 and lessening the user's workload. Further, when printing is performed on a layer-by-layer basis, a printing order to be printed continuously for each layer is changed in units of groups. That is, print labels of different layers in the same group is printed in the same order when printing labels in each layer, on a layer-by-layer basis. Specifically, the printing order for each layer is set in units of group so that different labels in a same group is located at a same position in printing orders for corresponding layers. For example, as shown in FIG. 9, the order of groups is changed from the order of the first, second, third, and fourth group to an order of the first, second, fourth, and third group. In this case, the printing order of labels for each layer is arranged based on this changed order of groups. In other words, the printing order for each layer is changed by units of groups. Specifically, when printing labels of the upper layer, the upper-layer print labels are printed in the order the same as the changed order of groups, that is, the upper-layer print labels of the first, second, fourth, and third groups are printed in this order. Similarly, when printing labels of the middle layer, the middle-layer print label of the first, second, fourth, and third groups are printed in this order. These changes of orders will prevent the user from mistaking the order in which the print labels L of all the layers are to be combined.

The object images in the print label images in the middle layer which have different printing colors is examples of the fourth label image and the fifth label image. The alternate objects are examples of the plurality of object image candidates. The upper print label image "Saburo Takahashi" in the third composite label data is an example of the sixth label image. The graphic object image of the middle layer in the same third group which has printing color different from other is an example of the seventh label image.

Figure 10:
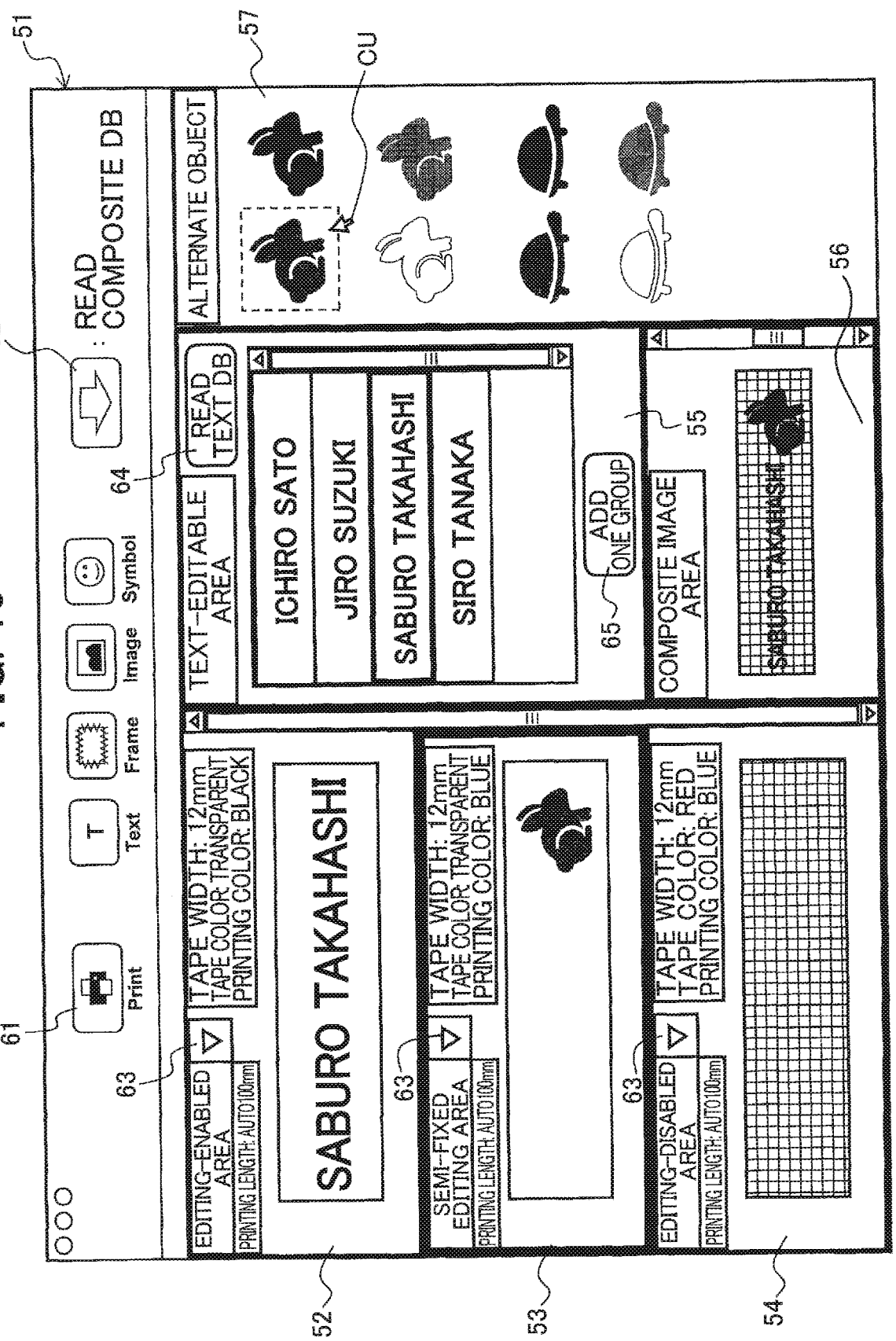
FIG. 10 is an explanatory diagram illustrating an example of the editing screen in the semi-fixed editing mode to display a list of a plurality of alternate objects having different combinations of a printing color and an object.

As shown in the example of FIG. 10, the alternate objects used in the semi-fixed editing mode may include a plurality of different combinations of printing patterns for the graphic object (two types in this example: a rabbit and a turtle) and printing colors (four colors in this example). In this case, by changing (arranging) the printing order by units of groups when continuously printing labels of corresponding layers so as to consecutively print labels in groups having the same printing color, as illustrated in FIGS. 9 and 11, the frequency of replacing the cartridge 101 can be reduced to lessen the user's workload.

Control Procedure

A sample control procedure executed by the CPU 31 of the operation terminal 3 to implement the above-described method of the present embodiment will be described with reference to the flowcharts in FIGS. 12 through 15. The following procedure shown in FIG. 12 begins when the user starts up the label image creating program on the operation terminal 3.

Figure 12:
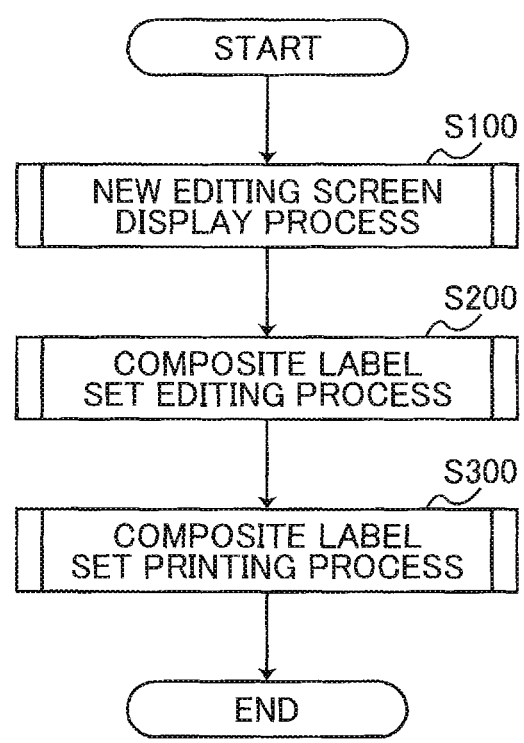
FIG. 12 is a flowchart illustrating a control procedure for a label image creating program.

In S100 of FIG. 12 the CPU 31 executes a new editing screen display process to display a new editing screen on the display 34 for editing a composite label set (a plurality of composite labels LS), as shown in FIG. 6 and the like. This process will be described later in detail with reference to FIG. 13.

Next, in S200 the CPU 31 executes a composite label set editing process to accept editing operations in the displayed editing screen for editing data in the composite label set. The content of this process will be described later in greater detail with reference to FIG. 14.

Next, in S300 the CPU 31 executes a composite label set printing process to create print labels L through continuous printing print labels L of each layer (continuous printing on a layer-by-layer basis) on the label printer 2 based on the edited data for the composite label set. This process will be described later in greater detail with reference to FIG. 15. After completing S300, the process of FIG. 12 ends.

Figure 13:
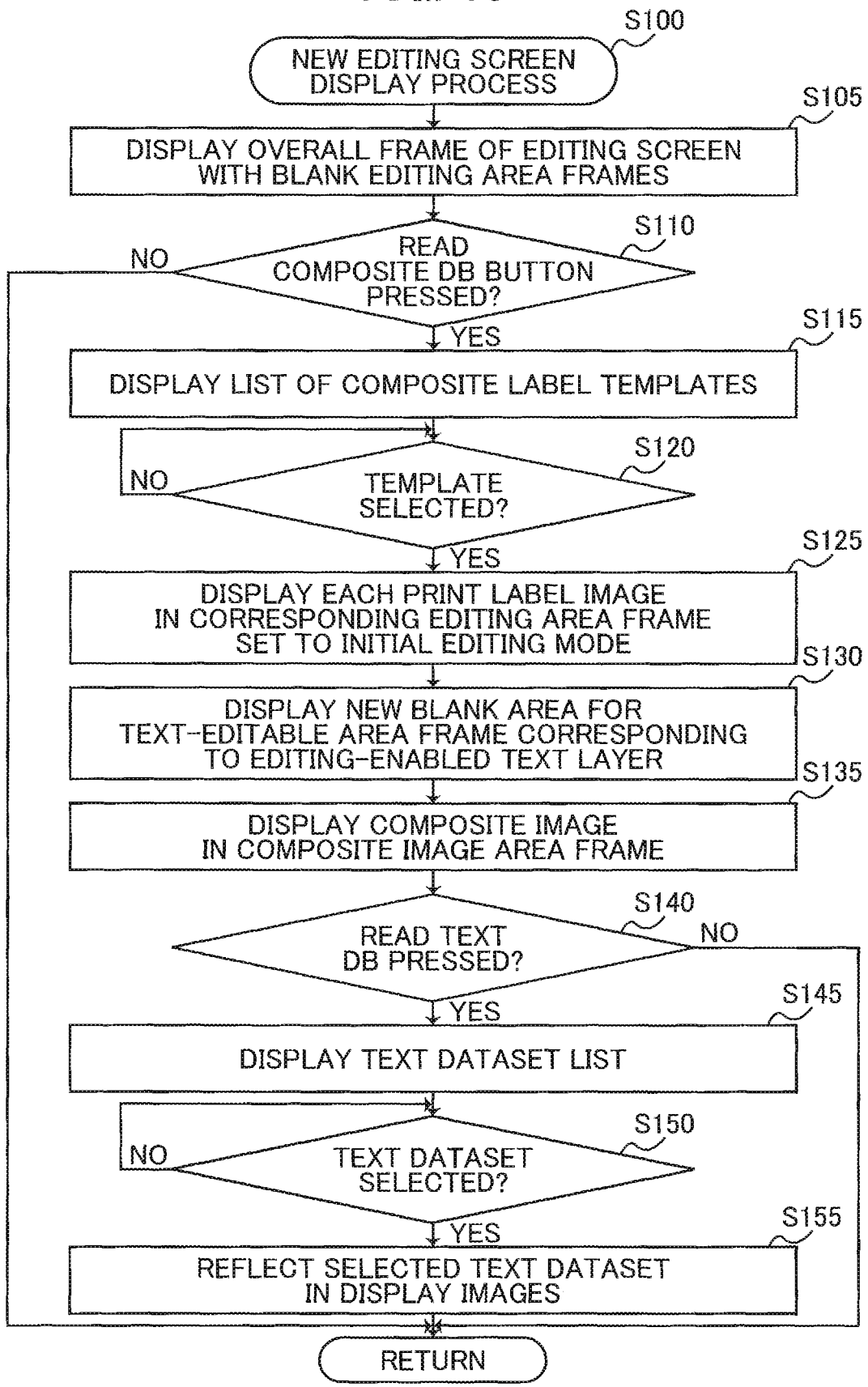
FIG. 13 is a flowchart illustrating a control procedure for a new editing screen display process.

FIG. 13 is a flowchart illustrating steps in the new editing screen display process of S100 described above.

In S105 of FIG. 13, the CPU 31 displays the overall frame 51 of the editing screen on the display 34, wherein each of the editing area frames 52, 53, and 54 is blank. In S110 the CPU 31 determines whether the read composite label template data button 62 was pressed. In a case that the read composite label template data button 62 has been pressed (S110: YES), in S115 the CPU 31 reads the plurality of pieces of composite label template data that was pre-stored in the memory 32 or the high-capacity storage 36 and displays a list of the composite label templates in a separate screen. Here, each composite label template data includes a template of the composite label. In S120 the CPU 31 determines whether one of the composite label templates was selected and continues to wait in a loop while a template has not been selected (S120: NO). The CPU 31 advances to S125 when a selection has been made (S120: YES). In a case that the CPU 31 determines that the read composite label template data button 62 was not operated in S110 (S110: NO), the CPU 31 ends the process of FIG. 13 so that a composite label can be created from scratch. The following description according to the present embodiment assumes that a YES determination was made in S110, indicating that the user wishes to edit composite labels based on a composite label template.

In S125 the CPU 31 displays the print label image for each layer of the selected composite label template data in the corresponding one of the editing area frames 52, 53, and 54, which are set to their initial editing mode. In S130 the CPU 31 displays a new blank area for the text-editable area frame 55 corresponding to the editing-enabled text layer in the selected composite label template data. In S135 the CPU 31 displays a composite image in the composite image area frame 56. The composite image is formed by combining the print label image of all the layers in the selected composite label template data.

In S140 the CPU 31 determines whether the read text dataset button 64 was pressed. When the read text dataset button 64 has been pressed (S140: YES), in S145 the CPU 31 reads a plurality of text datasets pre-stored in the memory 32 or the high-capacity storage 36, and displays a list of the text datasets in a separate screen. In S150 the CPU 31 waits in a loop (S150: NO) until a text dataset has been selected (S150: YES) and advances to S155 when a selection has been made. In a case that the read text dataset button 64 was not operated in S140 (S140: NO), the CPU 31 ends the process of FIG. 13 while leaving the text-editable area frame 55 blank.

In S155 the CPU 31 reflects data of the selected text dataset (a first piece of text data, for example) in the print label image displayed in the corresponding editing area (the editing frame 52 in this example), the text list displayed in the text-editable area frame 55, and the composite image displayed in the composite image area frame 56. Subsequently, the CPU 31 ends the process of FIG. 13.

With respect to the process of S155, the print label image of the text object "Ichiro Sato" is an example of the first label image. The process for generating the print label image "Ichiro Sato" is an example of the first generation process or means. The print label image of the text object such as the image "Jiro Suzuki" different from "Ichiro Sato" is an example of the second label print image. The process for generating the print label image "Jiro Suzuki" is an example of the second generation process or means. The print label of the background mesh pattern printed on the lower layer print label L1 is an example of the third label image. The process for generating the print label image of the background mesh pattern is an example of the third generating process or means. With respect to the process of S155, the composite image obtained by combining the print image "Ichiro Sato" with the background pattern is an example of the first composite image. The composite image obtained by combining the print image "Jiro Suzuki" with the background pattern is an example of the second composite image. The text data of the "Ichiro Sato" read in S155 is an example of the first text information. The text data of the "Jiro Sato" read in S155 is an example of the second text information. The text dataset is an example of a plurality of pieces of text information. The process of S155 is an example of the text acquisition process. The processes of S125, S140, and S135 are examples of the base acquisition process, and the acquisition process and means.

Figure 14:
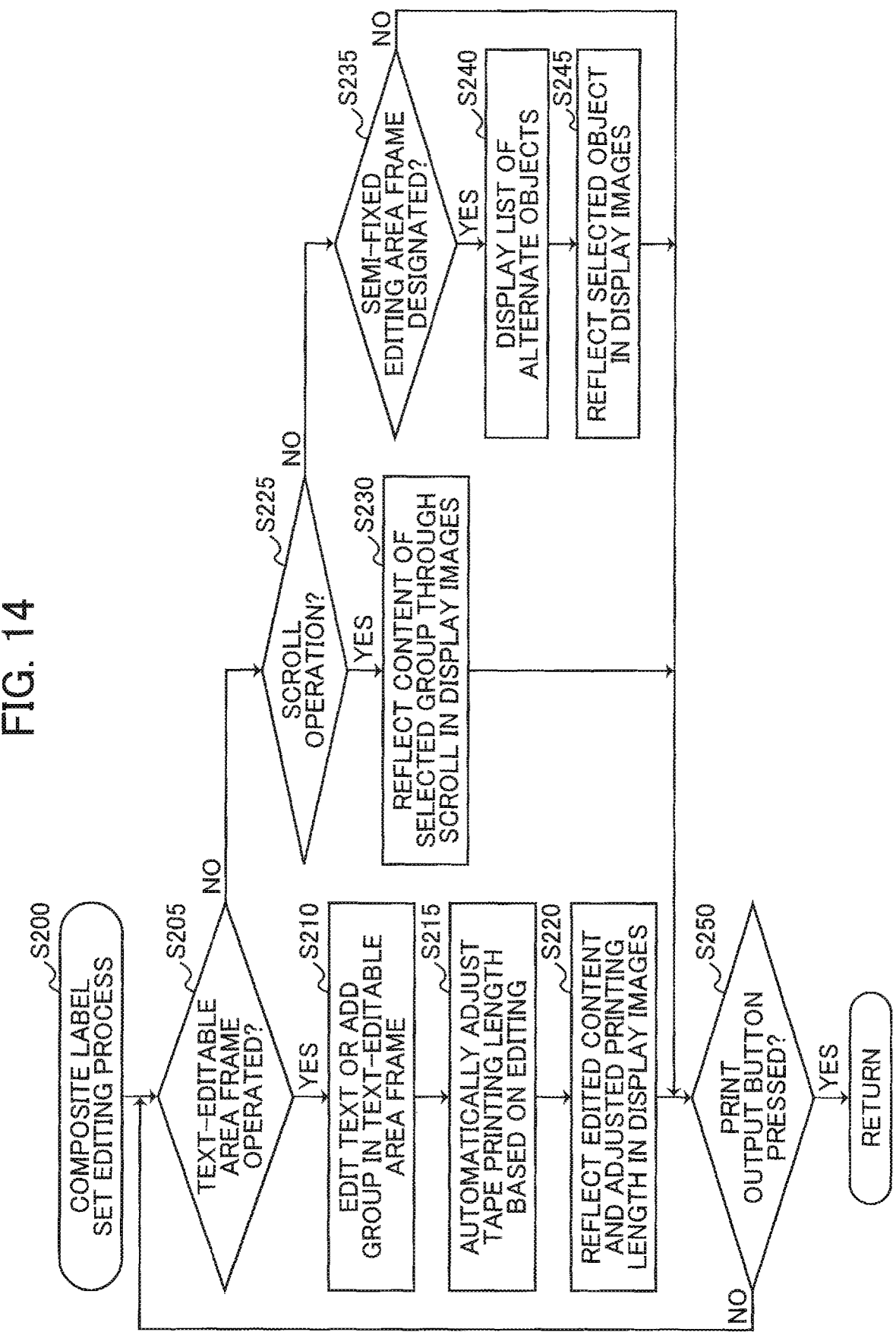
FIG. 14 is a flowchart illustrating a control procedure for a composite label set editing process.

FIG. 14 is a flowchart illustrating steps in the composite label set editing process of S200 described above.

In S205 at the beginning of the process in FIG. 14, the CPU 31 determines whether an operation was performed in the text-editable area frame 55. When the user has performed an operation in the text-editable area frame 55 (S205: YES), in S210 the CPU 31 executes processes based on the operation, such as, a text editing process based on the user operations in the text-editable area frame 55 or a process to add data for one composite label (one group) based on an operation on the Add Text button 65. Here, the data for one composite label (one group) is a piece of composite label data. In S215 the CPU 31 automatically adjusts the tape printing length for each layer based on the text editing content. In other words, in a case that the character string in the edited text increased and no longer fits within the initial tape printing length, the CPU 31 modifies the tape printing length to suit the length of the character string in the edited text and adjusts the tape printing length for other layers to match (or correspond to) this modified tape printing length. In S220 the CPU 31 reflects the edited content and the adjusted printing length in the displays of the print label images for all layers and the composite image and modifies data for the corresponding composite label (the corresponding group) accordingly. Subsequently, the CPU 31 advances to S250 described later.

On the other hand, when the user has not performed an operation in the text-editable area frame 55 (S205: NO), in S225 the CPU 31 determines whether the user performed a scroll operation in the composite image area frame 56. When the user performed a scroll operation (S225: YES), in S230 the CPU 31 displays the print label image for each layer and the composite image corresponding to the group (composite label LS) selected through the scroll operation in the corresponding editing area frames 52, 53, and 54 and composite image area frame 56. Subsequently, the CPU 31 advances to S250 described later.

When the user has not performed a scroll operation in the composite image area frame 56 (S225: NO), in S235 the CPU 31 determines whether the user performed an operation to designate a semi-fixed editing area frame as the editing target. When an operation to designate a semi-fixed editing area frame was not performed (S235: NO), the CPU 31 advances to S250 described later. However, when a designation operation was performed (S235: YES), in S240 the CPU 31 reads selectable alternate objects corresponding to the layer in the designated semi-fixed editing area frame and displays a list of these alternate objects in the alternate object frame 57. In S245 the CPU 31 modifies the print label image in the semi-fixed editing area frame based on the alternate object selected in the displayed list and modifies the corresponding piece of composite label data accordingly. The CPU 31 also reflects this change in the composite image displayed in the composite image area frame 56, and subsequently advances to S250.

In S250 the CPU 31 determines whether the user has finished editing operations and pressed the print output button 61. When the print output button 61 has not been pressed (S250: NO), the CPU 31 returns to S205 described above. However, once the print output button 61 has been pressed (S250: YES), the CPU 31 ends the process of FIG. 14.

The composite label set editing process S200 is an example of the display control process or means. The processes to generate the print label images having printing colors different from each other by repeating the process of S245 is an example of the fourth generation process and an example of a fifth generation process. The process of S220 to generate the upper layer print label "Saburo Takahashi" of the third group is an example of the sixth generation process. The process of S245 to generate the middle layer print label for the third group having printing color different from other groups is an example of the seventh generation process.

Figure 15:
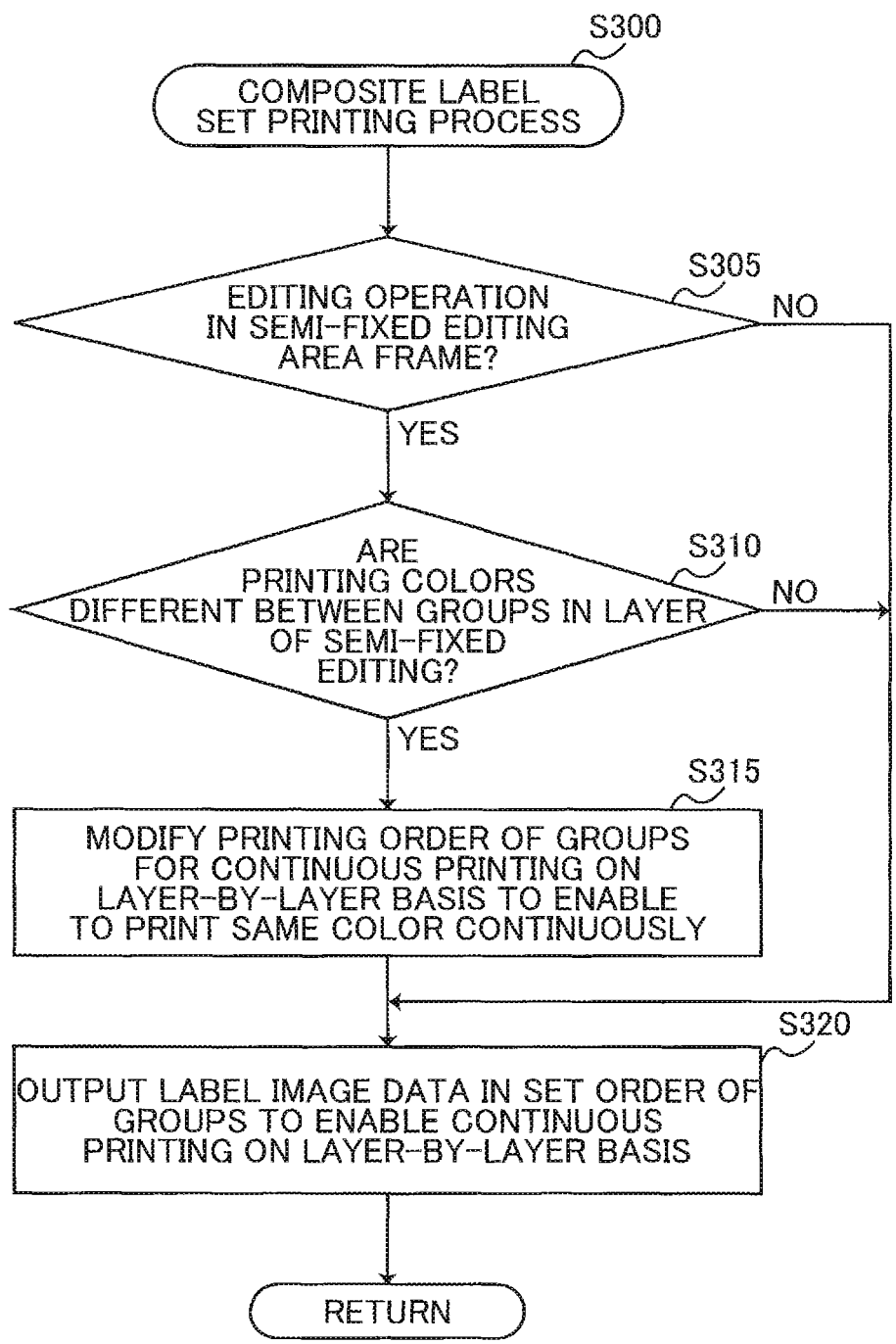
FIG. 15 is a flowchart illustrating a control procedure for a composite label set printing process.

FIG. 15 is a flowchart illustrating steps in the composite label set printing process of S300 described above. At the start of the flowchart in FIG. 15, it will be assumed that the printing order for continuous printing of each layer has been set to the normal ascending order by group number (in this example, first group→second group→third group→fourth group).

In S305 of FIG. 15 the CPU 31 determines whether an editing operation was performed in a semi-fixed editing area frame during the composite label set editing process described above. When an editing operation was not performed in a semi-fixed editing area frame (S305: NO), the CPU 31 advances to S320 described later. However, when an editing operation was performed in a semi-fixed editing area frame (S305: YES), in S310 the CPU 31 determines whether the printing color of one print label for the layer of the same semi-fixed editing area differs from a printing color of another print label for the same layer among the plurality of groups (the plurality of composite labels). When there is no difference in color among labels (S310: NO), the CPU 31 advances to S320 described later. However, when there is a difference in printing color (S310: YES), in S315 the CPU 31 modifies the printing order in units of groups for continuous printing on a layer-by-layer basis so that the same printing color can be printed continuously.

In S320 the CPU 31 outputs pieces of label image data for the print label images to the label printer 2 so that continuous printing is performed on a layer-by-layer basis in the current printing order set in units of groups. That is, all of the print label images for one layer are printed continuously in the printing order, and next, all of the print label images for next layer are printed continuously in the printing order, and so on. Here, the printing orders for all the layers are the same in terms of the order of composite labels LS (or, the order of the groups). That is, the when the printing order of the print labels for an upper layer is the order of the print labels of the first, second, fourth, and third group, the printing orders of the print labels for each remaining layer is the same as this order. At this time, the number of copies printed for the middle-layer print label Lm depends on the number of copies printed for the upper-layer print label Lu. The number of copies printed for the lower-layer print label Ll also depends on the number of copies printed for the upper-layer print label Lu. In this example, each of the copies printed for the lower-layer print label Ll and the number of copies printed for the middle-layer print label Lm is equivalent to the number of copies for the upper-layer print label Lu. Subsequently, the CPU 31 ends the process in FIG. 15.

The composite label set printing process of S300 is an example of the label set printing process or means.

Effects of the Embodiment

When executing the label image creating program in the present embodiment described above, the CPU 31 of the operation terminal 3 performs the process of S155, the composite label set editing process of S200, and the composite label set printing process of S300.

To create a plurality of composite labels LS, each of which possesses a plurality of labels of different layers laminated together, the CPU 31 generates a plurality of upper-layer print label images in S155 that correspond to the upper layers in all of the composite labels LS. These upper-layer print label images include the mutually different text images "Ichiro Sato" and "Jiro Suzuki," for example.

In the process of S155, the CPU 31 also generates a plurality of lower-layer print label images that correspond to the lower-layers in all of the composite labels LS. This plurality of lower layer print label images includes pattern images of background mesh patterns, for example.

The text image "Ichiro Sato" described above and the background mesh pattern image generated in the process of S155 are superimposed to produce a composite image of a first composite label LS (a first group). The text image "Jiro Suzuki" described above and the background mesh pattern image generated in the process of S155 are superimposed to produce a composite image of a second composite label LS (a second group). These two composite images both have a common background mesh pattern image, but each has a unique text image, "Ichiro Sato" and "Jiro Suzuki." These two composite images are displayed in the composite label set editing process of S200. Based on the composite image for the first group, the user can visually confirm the appearance of the first composite label LS (the first group), in which the unique text image "Ichiro Sato" in the upper layer is superimposed on the common background mesh pattern image in the lower layer. Based on the composite image for the second group, the user can visually confirm the appearance of the composite label LS (the second group), in which the unique text image "Jiro Suzuki" in the upper layer is superimposed on the common background mesh pattern image in the lower layer.

In the composite label set printing process of S300, the plurality of upper-layer text images generated in the process of S155 are printed by the label printer 2. Further, the background mesh pattern image common to all groups is printed the number of times depending on (equivalent to) the number of times the upper-layer text images are printed. The user can create a first composite label LS of the first group using the upper-layer print label Lu on which the upper-layer text image "Ichiro Sato" for the first group is printed, and the lower-layer print label Ll on which the background mesh pattern image is printed. The user can create a second composite label LS of the second group using the upper-layer print label Lu on which the upper-layer text image "Jiro Suzuki" for the second group is printed, and the lower-layer print label Ll on which the background mesh pattern image is printed.

When creating two composite labels LS for first and second groups, each having an overlapping upper layer and lower layer, the lower-layer print label image is used commonly in all groups while the text images "Ichiro Sato" and "Jiro Suzuki" unique to each group are used individually to compose and display a composite image for each of the first group and the second group.

In the present embodiment, editing operations for just one group are sufficient for the lower-layer print label image used commonly among the plurality of groups of print labels. Hence, when creating a composite label LS configured of a plurality of superimposed print labels L, the composite labels LS can be more easily created with less operational burden on the user than a conceivable case that editing operations are performed for print labels L for each layer and for each group.

Another particular feature of this embodiment is that composite images (the plurality of groups of print labels) can be interchangeably displayed in the composite label set editing process of S200. This enables the user to confirm images of a plurality of composite labels LS within a limited display area on the editing screen.

Another particular feature of this embodiment is that the memory 32 and/or the high-capacity storage 36 store the plurality of text datasets and the CPU 31 executes the process in S155 to acquire a user-selected text dataset, which in this example include the text object "Ichiro Sato" or "Jiro Suzuki," and generates a print label image including the text object "Ichiro Sato" or a print label image including the text object "Jiro Suzuki" acquired in the process of S155. Accordingly, using information acquired from a database provided in the memory 32 and/or the high-capacity storage 36, for example, the CPU 31 can easily generate a plurality of groups of print label images in the process of S155. Instead of or in addition to reading a text dataset which is prepared in advance as described above, the content of text objects may be automatically set as sequential numbers (a numerical sequence that increases sequentially) or freely inputted content, for example.

Another feature of the present embodiment is that the CPU 31 executes the processes in S125, S130, and S135 to acquire composite label template data that includes template data corresponding to a print label image to be formed on the print label tape 110 in the upper or middle layer, and template data corresponding to a print label image to be formed on the print label tape 110 in the lower layer. The template data corresponding to the upper layer or middle layer includes information on the initial editing mode designating the editing mode for the print label image to be formed on the print label tape 110 in the upper layer or middle layer. The template data corresponding to the lower layer includes information on the initial editing mode designating the editing mode for the print label image to be formed on the print label tape 110 in the lower layer. This enables the generation of a print label image for each layer based on the acquired composite label template data. In particular, since the composite label template data includes information on the initial editing mode for each print label image, the user need only edit print label images based on the composite label template data for the upper layer or middle layer whose editing mode indicates a high degree of editing freedom. Thus, this configuration facilitates the user in creating composite labels LS. Note that the user can arbitrarily modify the editing mode for each layer to increase the degree of editing freedom, as described above.

Another feature of the present embodiment is that in the composite label set editing process of S200 the CPU 31 provides, all in one screen, the composite image area frame 56 for displaying composite image of each composite label; the editing area frames 52 and 53 for displaying print label images to be formed on the print label tapes 110 of the upper layer and the middle layer; the editing area frame 54 for displaying a print label image to be formed on the print label tape 110 of the lower layer; and the text-editable area frame 55 for editing object data (text object) to be inputted into the print label image formed on the print label tape 110 of the upper layer. By displaying all area frames including the composite image area frame 56, the editing area frames 52 and 53 for the upper layer or middle layer, and the text-editable area frame 55, the composite label set editing process of S200 facilitates the user in editing print labels L for the plurality of layers and for a plurality of groups and in confirming the resulting composite images. While not shown in the drawings, in addition to displaying all of the above frames collectively in the same editing screen, the frames 52, 53, 54, 55, 56, and 57 may each be provided in a separate screen that can be selectively displayed.

According to the embodiment, the composite label LS is a label formed by superimposing print labels L for an upper layer, a middle layer, and lower layer. Here, the print labels L of the middle layer for a plurality of composite labels have different printing colors. Specifically, the CPU 31 executes the process of S245 to generate a print label image to be formed on the print label L for a middle layer having a specific printing color and subsequently executes the process of S245 to generate another print label image to be formed on the print label L for a middle layer having a printing color different from the specific color. The two middle layer print labels L include object images formed of different printing colors. In the composite label set editing process of S200, the display of the middle-layer print label image in the editing area frame 53 is switched among a plurality of middle-layer print label images having different printing colors. The two print label images of different colors, corresponding to the middle layer in this example, can be generated as the plurality of print label images generated in the repeatedly executed processes of S245. Since the print labels L for the middle layer can be created using print label images that differ only in color, the user convenience for creating a plurality of groups of print labels for composite labels LS can be enhanced. While the above example of middle layers is given for convenience, there are no restrictions on the number of layers nor the order in which they are overlaid. That is, while only three layers are used in the description of the present embodiment, various layer combinations may be used. For example, layer combinations may include four or more layers. Or, layer combinations may include a combination of two layers having an upper layer in the editing enabled mode, and a lower layer in the editing disabled mode or a combination of two layers having an upper layer in the fixed editing mode and a lower layer in the semi-fixed editing mode.

Another feature of the present embodiment is that in the process of S245 the CPU 31 generates a print label image including an object image selected from a plurality of alternate objects. This enables the user to select two desired print label images for the middle layer having different printing colors from among a plurality of alternate objects prepared in advance. In this example, each selected print label image for the middle layer is to be generated in S245.

Another feature of the present embodiment is that the composite label LS is configured of an upper-layer or middle-layer print label L overlaid on a lower-layer print label L. The tape printing length for printing the print label image in the composite label set printing process of S300 to form the upper-layer or middle-layer print label L is set to a length not exceeding the tape printing length for printing the print label image in the composite label set printing process of S300 to form the lower-layer print label L. This process facilitates the user in laminating labels since the length of the print label L corresponding to the upper layer or middle layer, which is to be bonded to the top of the print label L corresponding to the lower layer constituting the base, is no longer than the length of the print label L corresponding to this lower layer. Note that the above automatic adjustment need not be performed when the tape printing length preset in the composite label template data is a fixed parameter.

Another feature of the present embodiment is that the CPU 31 continuously prints print labels L for all groups and all layers on a layer-by-layer basis in the composite label set printing process of S300. That is, the CPU 31 continuously prints print labels L forming the same layer in all groups. As a result, print label images of all groups generated for each of the upper layer and the middle layer are printed continuously on the print label tape 110 on a layer-by-layer basis when the tape color of the base tape 102 is transparent. Further, print label images of all groups generated for the lower layer are continuously printed on the print label tape 110 when the tape color of the base tape 102 is a specific color. This method can suppress an increase in the number of times that cartridges 101 are replaced in the label printer 2 being used for printing. Note that rather than performing half cuts, the label image data may be set to simply print cut marks between consecutive print labels L when performing continuous printing.

Another feature of the present embodiment is that the CPU 31 executes a process in S220 to generate the text object in this example, which will be formed on the upper-layer print label L. The CPU 31 further executes a process in S245 to generate the graphic object image in this example, which will be formed on the middle-layer print label L and has an object of a different printing color from the color used in other middle-layer print label images. Further, when performing continuous printing labels in a target layer in the composite label set printing process of S300, the CPU 31 modifies the printing order for middle-layer print label images so that middle-layer print label images of the same printing color are printed continuously. In this case, the CPU 31 also modifies the printing order of print label images for each of the upper-layer and the lower-layer in accordance with the printing order for the middle layer, so that the printing orders of all the layers are modified in units of groups. Using the example shown in FIG. 8, in a case that only the graphic object of the third group is modified to have a different printing color from the other first, second, and fourth groups, the cartridge 101 would need to be replaced a total of two times when the printing order is the same as the initial order of the groups in the composite label set (the order of the first, second, third, and fourth groups). Therefore, the printing order is modified in this process by exchanging the third group and fourth group in order that graphic objects of groups having the same printing color are consecutive, as illustrated in FIG. 9. This modification can reduce the number of times cartridges 101 must be interchanged. In this case, since each printing order for continuous printing on a layer-by-layer basis is modified in units of groups, the user will not mistake how print labels L of each layer are to be combined when overlaying and bonding print labels.

Second Embodiment

Setting a Plurality of Editing Modes within a Print Label Image

In the first embodiment described above, one of the editing enabled mode, the semi-fixed editing mode, and the editing disabled mode is set for each print label image, but a plurality of editing modes may be set by units of geometrical regions within a single print label image. Specifically, two types of geometrical regions are distinguished in the composite label template data shown in the example of FIG. 16. That is, in the overall region of the single middle layer, the two locations on the ends in the tape length direction constitute one geometrical region, and the center location between these ends constitutes another geometrical region. Here, one geometrical region of two ends includes two separate sub-regions each having one of the two ends. A graphic object including slanted lines is arranged in the sub-region of each of the ends, and a graphic object including a rectangular frame with rounded corners is arranged in the center region. The editing mode is set to the semi-fixed editing mode only for the center region and to the editing disabled mode for the region of both ends.

Figure 17:
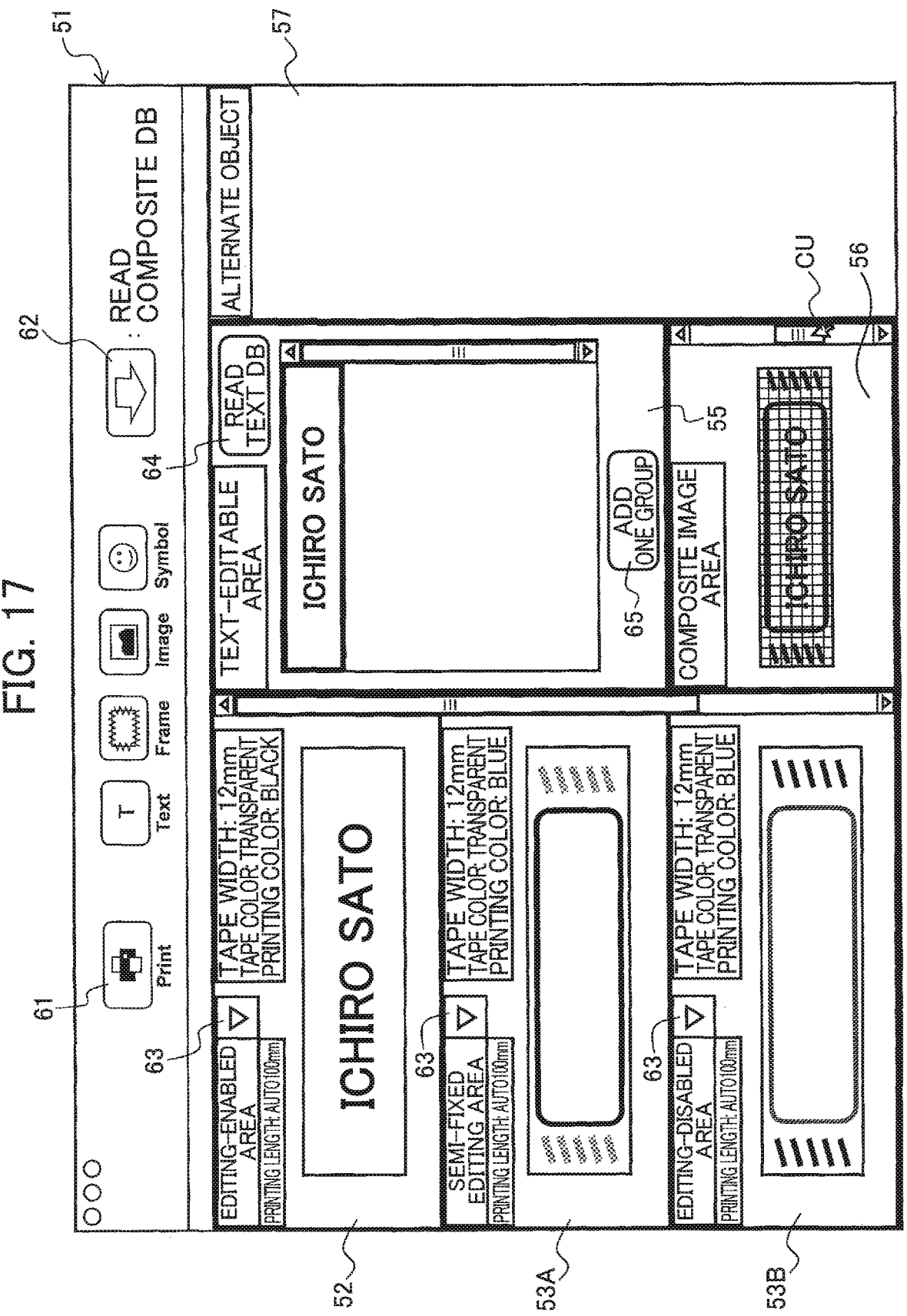
FIG. 17 is an explanatory diagram illustrating an example of an editing screen on the operation terminal to edit composite label data when the plurality of editing modes is set in the print label image.

When such composite label template data has been read, the CPU 31 may display individual editing area frames 53A and 53B corresponding to the different editing modes for the same middle-layer print label image, as illustrated in the editing screen of FIG. 17. In this case, shown in the drawing, object images associated with the displayed editing modes in the editing area frames 53A and 53B for the same layer may be displayed normally, while object images that do not correspond to the displayed editing modes may be displayed semi-transparently or in some different display format to make them less noticeable. For example, in the editing area frame 53A, the object image of the center region is displayed normally but the object images of the sub-regions for both ends including the slanted lines are displayed semi-transparently.

The region including both ends and the region including the center location are respectively an example of the first object region and an example of the second object region. The editing mode of the region including both ends and the editing mode of the region including the center location are respectively an example of the first region and an example of the second region. The editing frames 53A and 53B for the region including both ends and the region including the center location are respectively an example of the first editing screen and the second editing screen. The composite label set editing process of S200 is an example of the display process or means. The processes of S220 and S245 are examples of the generating process or means.

When executing the label image creating program according to the second embodiment described above, the CPU 31 of the operation terminal 3 performs the process of S155, the composite label set editing process of S200, especially the processes of S220 and S245.

To create a composite label LS with a plurality of layers laminated together, the CPU 31 acquires composite label template data in the process of S125, S130, and S135 to serve as a base for a plurality of pieces of label image data. The composite label template data includes a region having both ends and the center region described in this example.

Through the composite label set editing process of S200, the user can edit (or modify) composite label template data or data such as one of more pieces of label data based on the composite label template data in the editing screen displayed on the display 34. The editing screen includes the editing area frame 53A for editing the center region, and the editing area frame 53B for editing the region including the both ends.

In the editing area frame 53A, the initial editing mode for the center region is set to the semi-fixed editing mode. Thus, in the editing area frame 53A, the user can edit content in the center region as desired, for example.

In the editing area frame 53B for editing the region including both ends, the initial editing mode has been set to the editing disabled mode. Hence, editing both ends is more restrictive than editing the center region. Thus, when the region including both ends can be fixed content that does not need to be edited to other desired content, for example, there should be no problem in restricting editing in the region including both ends of the editing area frame 53B.

In the processes of S220 and S245, the CPU 31 generates a plurality of pieces of label image data for the plurality of layers according to the images edited in the editing screen displayed on the display 34. The user can create a composite label LS using a print label L printed based on label image data corresponding to the edited image in the editing area frame 53A for editing the center region and label image data corresponding to the edited image in the editing area frame 53B for editing the region includes both ends.

According to the second embodiment, since an editing area is displayed for each of the object areas which are included in the composite label template data and are different allowable ranges of editing (allowable degrees of freedom for editing), the user need only perform editing in the editing area frame 53A for the center region, for example. Therefore, the user can create a composite label LS more simply with less operational burden than when performing editing operations for the print labels L in all layers of print labels L.

In particular, since the composite label template data is initially acquired and processed in the second embodiment, editing can be performed without disrupting the base layout and the like. Note that the editing region of the editing enabled area and the editing region of the editing-disabled area may be within the same layer or in different layers.

Modifications

While the disclosure has been described in detail with reference to the specific embodiment thereof, it would be apparent to those skilled in the art that various changes and modifications may be made therein without departing from the scope of the invention.

While the embodiments described above cover the case in which the operation terminal 3 executes all of the processes (steps) for creating label images including S100-S300 to generate, edit, and output each label image data, the present disclosure is not limited to this configuration. The label printer 2 may also be directed to execute all the processes for creating label images. In this case, the control circuit 21 of the label printer 2 is an example of the computing unit, and the touchscreen 41 is an example of the display. Alternatively, some of the processes may be executed on the operation terminal 3 while the remainder may be executed on the label printer 2. Alternatively, all the processes may be executed by a plurality of programs installed on the operation terminal 3. For example, the processes of S100-S200 may be executed according to the label image creating program, while the process of S300 is executed by a printer driver separate from the label image creating program.

Further, the printing medium in the present embodiment is not limited to the cartridge 101 but may be roll paper having a printing surface and not accommodated in a cartridge case, and an ink ribbon configured separately from the roll paper, for example. The printing medium is also not limited to a continuous strip-like medium. The label printer 2 is also not limited to a thermal printer but may be any printer capable of printing print media having different medium colors or different printing colors.

Further, objects to be edited in the editing enabled mode are not limited to text objects but may be other specific objects as well, such as barcodes or two-dimensional codes.

In S220 the tape printing length is automatically adjusted for each layer based on the edited content, but the present disclosure is not limited to this configuration. For example, the tape printing length may be fixed, and the text size may be reduced to a size that fits within the tape printing length.

Prior to executing the process in S315, the CPU 31 may display a message prompting the user to indicate whether to change the printing order by units of groups when performing consecutive printing on a layer-by-layer basis so that the same printing color is used continuously and may perform the process in S315 when the user selects the option to change the printing order. The user may also be permitted to edit the color of objects corresponding to an editing enabled area. In this case, the same process described in S310 for layers with a semi-fixed editing area may be performed for layers with an editing enabled area. Further, the types of editing modes are not limited to the three types described in the embodiments but may be any of a plurality of modes that have different allowable ranges (different allowable degrees of freedom) for editing.

In the embodiments described above, a single composite image is displayed in the composite image area frame 56, and the displayed image is changed to another by scrolling, but the composite image area frame 56 may display a plurality of composite images. Further, the order in which each editing area is displayed is not limited to the order in which the layers are overlaid. Further, in a case that a printing color is used in a plurality of editing areas, a single print label may be formed by combining the images edited in these editing areas.

The flowcharts of FIGS. 12-15 do not limit the flows of the processes of the present disclosures, and these processes may be modified by adding or deleting one or more steps, or changing the order of steps.

Methods, processes, Steps, and components described in the embodiments and their modifications may be combined arbitrary.

What is claimed is:

1. A non-transitory computer readable storage medium storing a set of program instructions installed on and executed by a computer included in a label image generation device for generating a plurality of label images corresponding to respective ones of a plurality of labels, the plurality of label images being used for creating one or more composite labels, wherein in each of the one or more composite labels a label for a first layer created from a first printing medium and a label for a second layer created from a second printing medium are overlaid, the set of program instructions, when executed by the computer, causing the label image generation device to perform:
- a first generation process to generate a first label image for the first layer to be formed on the first printing medium;
- a second generation process to generate a second label image for the first layer to be formed on the first printing medium, the second label image being different from the first label image;
- a third generation process to generate a third label image for the second layer to be formed on the second printing medium;
- displaying a first composite image representing an image of a first composite label and a second composite image representing an image of a second composite label, wherein in the first composite image, the first label image and the third label image are overlaid, wherein in the second composite image, the second label image and the third label image are overlaid; and
- outputting a print instruction to a printing mechanism to print the first label image on the first printing medium for creating a first number of first labels for the first layer, to print the second label image on the first printing medium for creating a second number of second labels for the first layer, and to print the third label image on the second printing medium for creating a third number of third labels for the second layer, the third number being the sum of the first number and the second number, the print instruction including order information, the order information specifying an order of printing so that a combination of the first number of first labels and the second number of second labels is printed continuously.

2. The non-transitory computer readable storage medium according to claim 1, wherein the displaying selectively displays the first composite image and the second composite image.

3. The non-transitory computer readable storage medium according to claim 1, wherein the set of program instructions, when executed by the computer, causes the label image generation device to perform:
- acquiring a first piece of text object information and a second piece of text object information from a storage,
- wherein the first generation process generates the first label image to have the first piece of text object information,
- wherein the second generation process generates the second label image to have the second piece of text object information.

4. The non-transitory computer readable storage medium according to claim 1, wherein the set of program instructions, when executed by the computer, causes the label image generation device to perform:
- acquiring first base data and second base data,
- wherein the first base data corresponds to one or more label images to be printed on the first printing medium, and includes first information on a first allowable degree of freedom within which one or more label images to be printed on the first printing medium can be generated,
- wherein the second base data corresponds to one or more label images to be printed on the second printing medium, and includes second information on a second allowable degree of freedom within which one or more label images to be printed on the second printing medium can be generated, the second allowable degree being different from the first allowable degree.

5. The non-transitory computer readable storage medium according to claim 1, wherein the displaying displays a screen including a composite image display region, a first display region, a second display region, and an editing region,
- wherein the composite image display region is to display the first composite image and the second composite image, the first display region is to display one or more label images to be printed on the first printing medium, the second display region is to display one or more label images to be printed on the second printing medium, and the editing region is to be used to edit object information which is to be inputted into one or more label images to be printed on the first printing medium.

6. The non-transitory computer readable storage medium according to claim 5, wherein in the first composite label, a label created from the first printing medium, a label created from the second printing medium, and a label created from a third printing medium are overlaid, wherein in the second composite label, a label created from the first printing medium, a label created from the second printing medium, and a label created from a fourth printing medium are overlaid,
- wherein the set of program instructions, when executed by the computer, causes the label image generation device to further perform:
  - a fourth generation process to generate a fourth label image to be formed on the third printing medium; and
  - a fifth generation process to generate a fifth label image to be formed on the fourth printing medium,
- wherein the fourth label image includes a first object, the fifth label image includes a second object whose color is different from the second object,
- wherein the screen further includes a third display region to selectively display the fourth label image and the fifth label image.

7. The non-transitory computer readable storage medium according to claim 6, wherein the fifth generation process generates the fifth label image so that the fifth label image includes an object image which is selected from among a plurality of object candidate images.

8. The non-transitory computer readable storage medium according to claim 1, wherein in each of the one or more composite labels, a label created from the first printing medium is overlaid on a label created from the second printing medium,
- wherein the first label image and the second label image are generated so that a printing length of the first label image to be printed on the first printing medium is less than or equal to a printing length of the second label image to be printed on the second printing medium.

9. The non-transitory computer readable storage medium according to claim 1, wherein the outputting outputs the print instruction to the printing mechanism to continuously print a combination of the first number of first labels and the second number of second labels, and to continuously print the third label image on the second printing medium for creating the third number of third labels.

10. The non-transitory computer readable storage medium according to claim 9, wherein the set of program instructions, when executed by the computer, causes the label image generation device to further perform:

a fourth generation process to generate a fourth label image to be formed on the first printing medium; and
a fifth generation process to generate a fifth label image to be formed on a third printing medium,
wherein the one or more composite labels includes a first-type label group having one first label as the first layer and one third label as the second layer, a second-type label group having one second label as the first layer and one third label as the second layer, and a third-type label group having one fourth label as the first layer and one fifth label as the second layer, wherein in each composite label, a label of the first layer and a label of the second layer are overlaid,
wherein the outputting outputs the print instruction to the printing mechanism to print the first label image on the first printing medium for creating the first number of first labels, to print the second label image on the first printing medium for creating the second number of second labels, the third label image on the second printing medium for creating the third number of third labels, the fourth label image on the first printing medium for creating the fourth number of fourth labels, and the fifth label image on the third printing medium for creating the fifth number of fifth labels,
wherein the outputting arranges an order in which label images are printed so that:
printing is performed on a layer-by-layer basis to print labels in a same layer continuously and a printing order is defined for each layer;
the printing order for each layer is set in units of group so that different labels in a same group are located at a same position in printing orders for corresponding layers;
printing the third number of the third label is continuously executed; and
a combination of the first number of the first print labels, the second number of the second labels, and the fourth number of the fourth labels are printed continuously.

11. A non-transitory computer readable storage medium storing a set of program instructions installed on and executed by a computer included in a label image generation device for generating a plurality of label images corresponding to respective ones of a plurality of labels, the plurality of label images being used for creating one or more composite labels, wherein in each of the one or more composite labels a label for a first layer created from a first printing medium and a label for a second layer created from a second printing medium are overlaid, the set of program instructions, when executed by the computer, causing the label image generation device to perform:
acquiring a piece of base data from among one or more pieces of base data, the acquired piece of base data including a first object region for a first-layer image for the first layer and a second object region for a second-layer image for the second layer, each piece of base data being data to be used for generating the plurality of label images;
displaying a first editing screen corresponding to the first object region and a second editing screen corresponding to the second object region, the first editing screen being for editing the first-layer image for the first layer and modifying the acquired piece of base data according to the editing of the first-layer image, the second editing screen being for editing the second-layer image for the second layer and modifying the acquired piece of base data according to the editing of the second-layer image, the editing in the first editing screen being allowed within a first allowable degree of freedom, the editing in the second editing screen being allowed within a second allowable degree of freedom different from the first allowable degree of freedom; and
generating the plurality of label images based on at least one of modification of the acquired piece of base data through the first editing screen and modification of the acquired piece of base data through the second editing screen.

12. A label image generation device comprising:
a control device to generate a plurality of label images corresponding to respective ones of a plurality of labels, the plurality of label images being used for creating one or more composite labels, wherein in each of the one or more composite labels a label for a first layer created from a first printing medium and a label for a second layer created from a second printing medium are overlaid,
wherein the control device is configured to perform:
a first generation process to generate a first label image for the first layer to be formed on the first printing medium;
a second generation process to generate a second label image for the first layer to be formed on the first printing medium, the second label image being different from the first label image;
a third generation process to generate a third label image for the second layer to be formed on the second printing medium;
displaying a first composite image representing an image of a first composite label and a second composite image representing an image of a second composite label, wherein in the first composite image, the first label image and the third label image are overlaid, wherein in the second composite image, the second label image and the third label image are overlaid; and
controlling a printing mechanism to print the first label image a first number of times on the first printing medium for creating the first number of first labels for the first layer, to print the second label image a second number of times on the first printing medium for creating the second number of second labels for the first layer, and to print the third label image a third number of times on the second printing medium for creating the third number of third labels for the second layer in a manner that a combination of the first number of first labels and the second number of second labels is printed continuously, the third number depending on both the first number and the second number.

13. A label image generation device comprising:
a control device to generate a plurality of label images corresponding to respective ones of a plurality of labels, the plurality of label images being used for creating one or more composite labels, wherein in each of the one or more composite labels a label for a first layer created from a first printing medium and a label for a second layer created from a second printing medium are overlaid,
wherein the control device is configured to perform:
acquiring a piece of base data from among one or more pieces of base data, the acquired piece of base data including a first object region for a first-layer image for the first layer and a second object region for a second-layer image for the second layer, each piece of base data being data to be used for generating the plurality of label images;

displaying a first editing screen corresponding to the first object region and a second editing screen corresponding to the second object region, the first editing screen being for editing the first-layer image for the first layer and modifying the acquired piece of base data according to the editing of the first-layer image, the second editing screen being for editing the second-layer image for the second layer and modifying the acquired piece of base data according to the editing of the second-layer image, the editing in the first editing screen being allowed within a first allowable degree of freedom, the editing in the second editing screen being allowed within a second allowable degree of freedom different from the first allowable degree of freedom; and generating the plurality of label images based on at least one of modification of the acquired piece of base data through the first editing screen and modification of the acquired piece of base data through the second editing screen.

14. The non-transitory computer readable storage medium according to claim 11, wherein the first allowable degree of freedom is a degree of freedom that allows editing of text included in the first-layer image, wherein the second allowable degree of freedom is a degree of freedom that allows changing of a color of the second-layer image.

15. The non-transitory computer readable storage medium according to claim 11, wherein the displaying displays a main editing screen including both the first editing screen and the second editing screen.

* * * * *